April 14, 1959     T. A. WETZEL     2,881,666
PATTERN CONTROLLED MACHINE TOOL
Filed Aug. 23, 1954     6 Sheets-Sheet 1

INVENTOR.
Theodore A. Wetzel
BY
Leroy J. Wutschel
Attorney

April 14, 1959   T. A. WETZEL   2,881,666
PATTERN CONTROLLED MACHINE TOOL
Filed Aug. 23, 1954   6 Sheets-Sheet 2
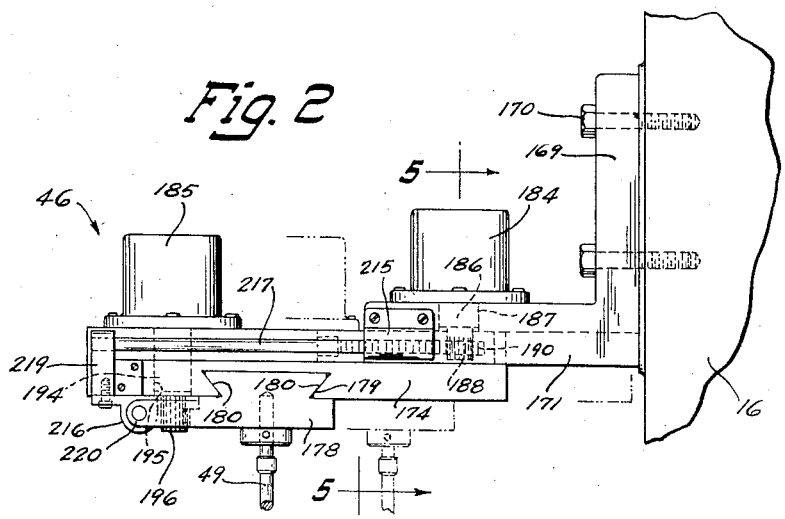
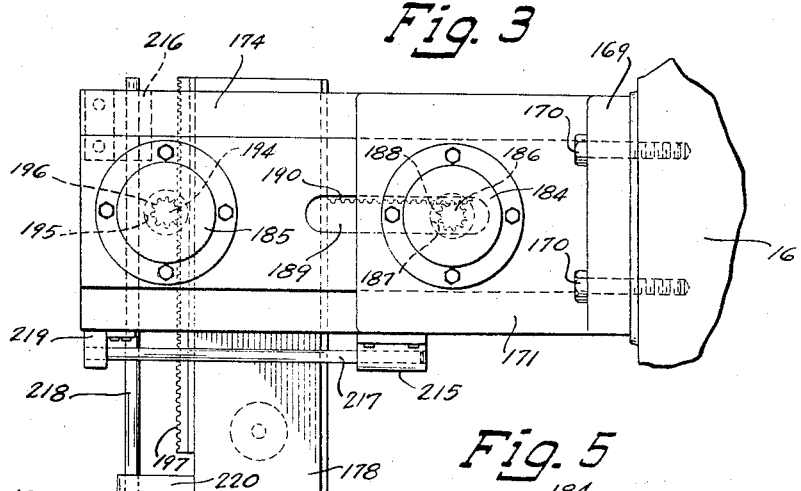
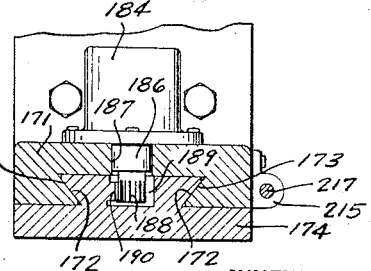
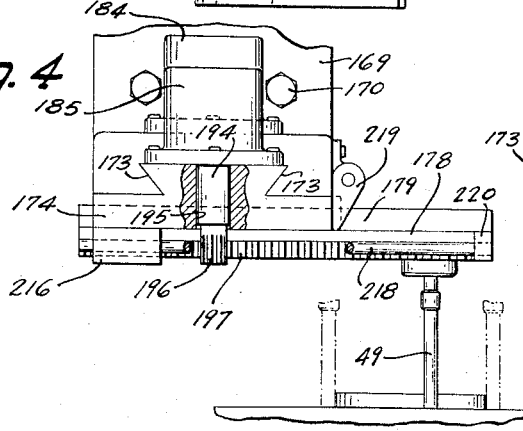
INVENTOR.
Theodore A. Wetzel
BY
Elroy J. Wutschel
Attorney

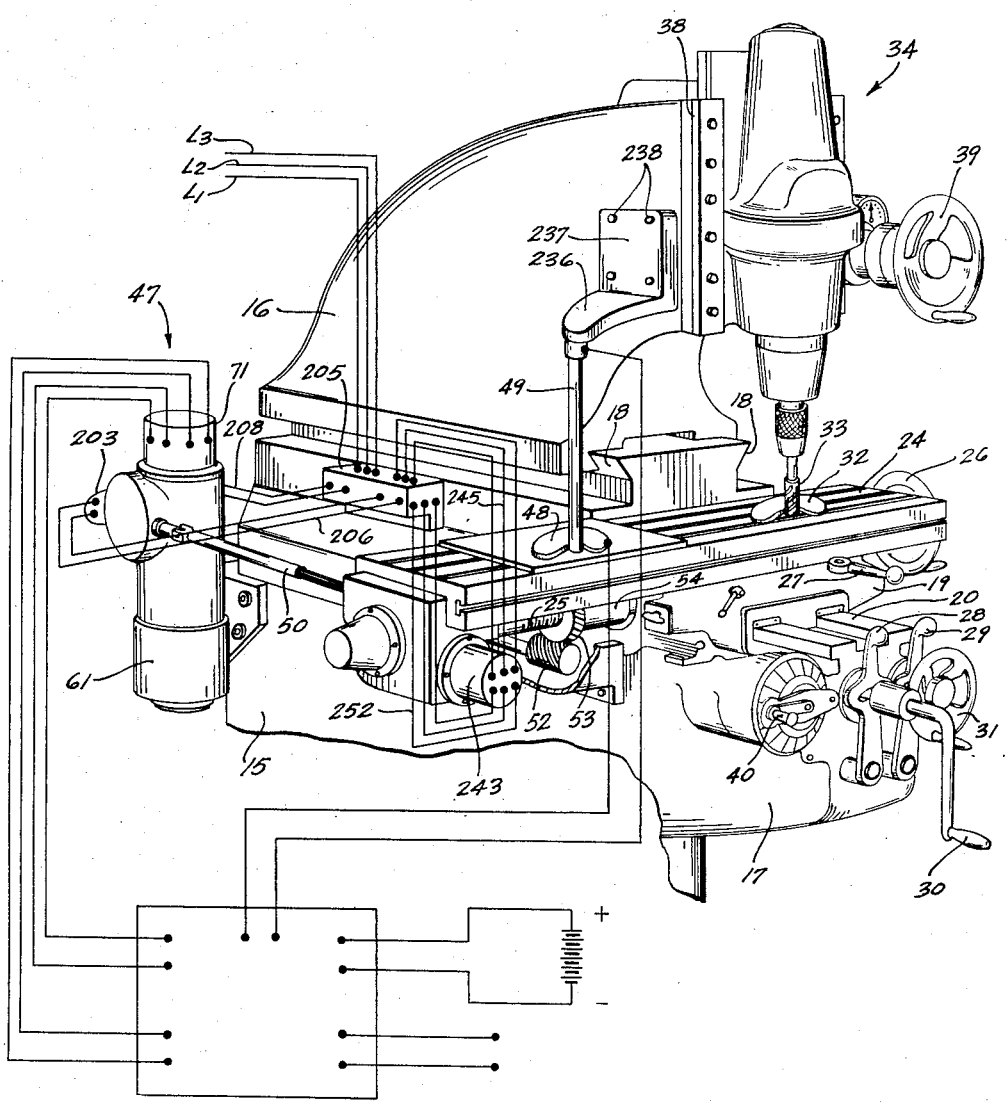

April 14, 1959  T. A. WETZEL  2,881,666
PATTERN CONTROLLED MACHINE TOOL
Filed Aug. 23, 1954  6 Sheets-Sheet 4
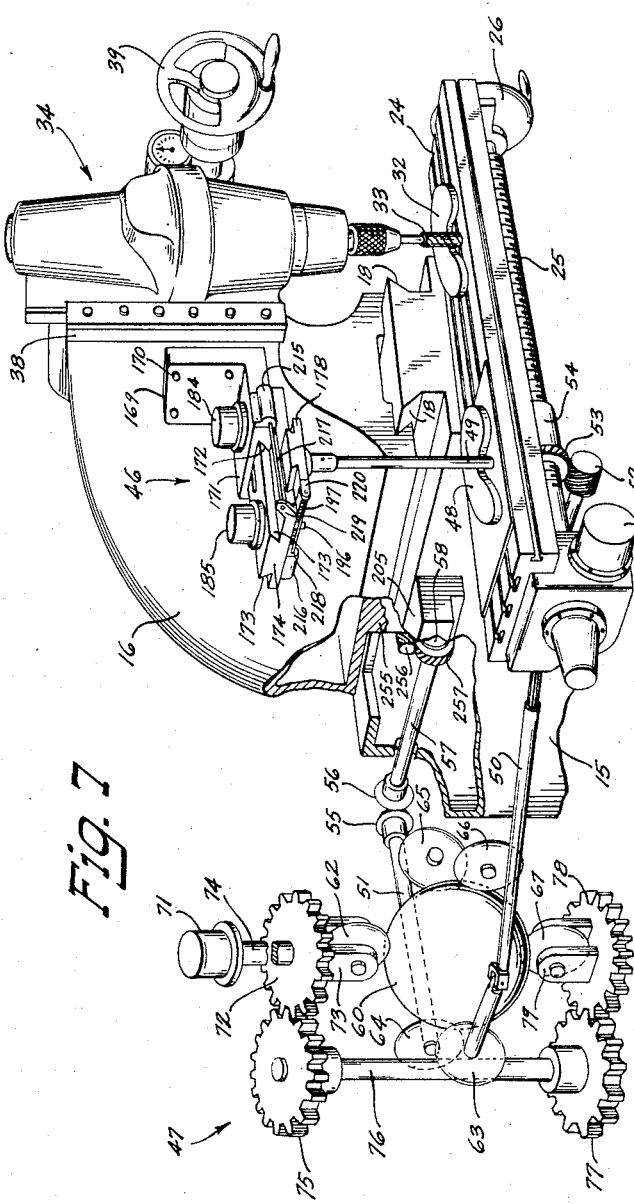
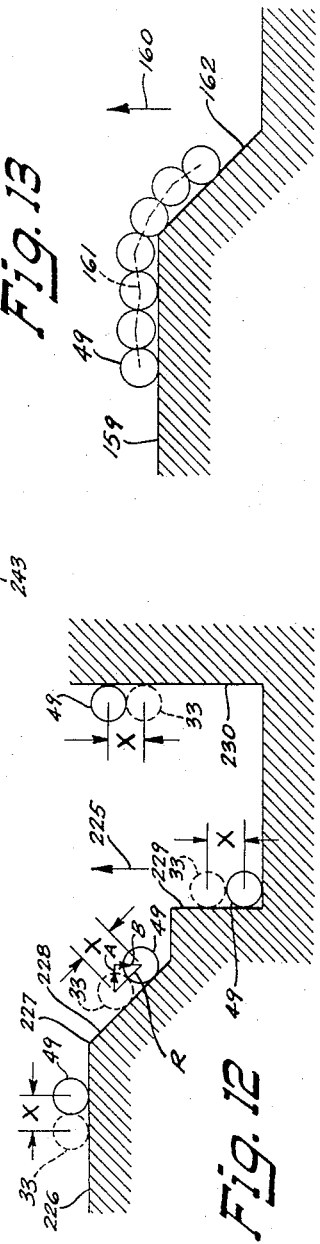
INVENTOR
Theodore A. Wetzel
BY
ATTORNEY April 14, 1959     T. A. WETZEL     2,881,666
PATTERN CONTROLLED MACHINE TOOL
Filed Aug. 23, 1954     6 Sheets-Sheet 5

INVENTOR
Theodore A. Wetzel
BY
Elroy J. Wutschel
ATTORNEY

April 14, 1959  T. A. WETZEL  2,881,666
PATTERN CONTROLLED MACHINE TOOL
Filed Aug. 23, 1954  6 Sheets—Sheet 6

INVENTOR
Theodore A. Wetzel
BY
Elroy J Wutschel
ATTORNEY

United States Patent Office 2,881,666
Patented Apr. 14, 1959

2,881,666

PATTERN CONTROLLED MACHINE TOOL

Theodore A. Wetzel, Milwaukee, Wis., assignor to Kearney & Trecker Corporation, West Allis, Wis., a corporation of Wisconsin Application August 23, 1954, Serial No. 451,669

46 Claims. (Cl. 90—13.5)

This invention relates generally to pattern controlled machine tools, and more particularly to an improved machine tool especially adapted to produce accurate reproductions of a pattern.

An inherent characteristic of pattern controlled machine tools is the existence of a time lag from the instant the tracer detects a change in the pattern contour to the time when the direction of relative movement of the cutter is changed accordingly. For this reason there is a tendency for the cutter to overtravel a change in contour of the pattern, resulting in an inaccurate reproduction, the amount of overtravel, of course, varying directly with the rate of travel of the movable elements and the degree of change in the contour of the pattern.

The accuracy of the reproduction may be substantially increased by minimizing such overtravel through the expedient of advancing the tracer stylus a small amount ahead of the cutter in the path of travel for anticipating the contour of the pattern. With this arrangement, the stylus reaches a point in the path of travel on the pattern an instant before the cutter arrives at the corresponding point in the path of travel on the workpiece. The stylus therefore detects a change in the contour of the pattern an instant before the cutter arrives at the corresponding point on the workpiece. During the time that it takes to charge the rate of movement of the movable elements to effect a change in the direction of relative movement between the cutter and workpiece, the cutter is traveling along the workpiece. When the machine responds to the detection of the change in contour of the pattern to correct the direction of relative movement of the cutter accordingly, the cutter has arrived at the point on the workpiece corresponding substantially to the point on the pattern where the tracer stylus detected the change in contour.

Since the amount of overtravel varies directly with the rate of feed of the cutter along the workpiece, it is necessary to vary the distance of advance of the stylus in the path of travel ahead of the cutter in its corresponding path of travel by an amount proportional to the feed rate. An increase in the feed rate necessitates an increase in advance of the stylus, and conversely, a decrease in the feed rate requires a decrease in the stylus advance.

The tracer mechanism disclosed in United States Patent 2,786,396, provides for maintaining the tracer stylus a slight amount in advance of the cutter in the path of travel along the outline of the pattern and workpiece respectively to anticipate the contour of the pattern. However, as in other known tracer mechanisms similarly adapted, for an established setting, the amount of such advance is constant, and upon a change in the feed rate, it is necessary to stop the operation of the machine and reset the stylus manually for varying the distance of advance in the travel path to accommodate the new feed rate. Such manual adjustment is avoided in the present invention by rendering the tracer mechanism responsive to the feed rate for changing the distance of tracer stylus advance automatically in accordance with a change in the feed rate.

In addition to providing for the automatic advancement of the tracer stylus ahead of the cutter in the path of travel for anticipating the contour of the pattern, the present invention also includes an arrangement for increasing the rates of deceleration and acceleration of the movable members of the machine to further increase the accuracy of the reproduction. Advancement of the tracer stylus serves very efficiently to correct the error in reproduction caused by the time required for the control system to respond to the detection by the tracer stylus of a change in the contour of the pattern, but it does not eliminate the error introduced by the delay in accelerating or decelerating the movable members of the machine to the rate of travel demanded by a change in the contour of the pattern.

If the tracer stylus is not advanced ahead of the cutter in the path of travel, the time lag in the response of the control system to a signal from the tracer, and the time required to accelerate and decelerate the movable members of the machine in response to a change in the contour of the pattern, will cause the stylus and cutter to overtravel the contour of the pattern and workpiece respectively. The tracer stylus may be advanced ahead of the cutter in the path of travel to anticipate the pattern contour and correct for the error in reproduction occasioned by the time required for the control system to respond to the detection by the tracer stylus of a change in the contour of the pattern, and also to eliminate the overtravel otherwise caused by the time required for the acceleration and deceleration of the movable members of the machine to the desired rates of travel.

With this arrangement, the cutter will begin to negotiate a corner before it arrives at the corner, immediately when acceleration and deceleration is initiated, because of the fact that the stylus will reach the corner before the cutter has reached the corresponding point on the workpiece. As acceleration or deceleration of the movable member is occurring, the cutter will continue to negotiate the corner in an arcuate path, deviating from the prescribed path of a sharp corner, until the acceleration and deceleration of the movable members has been completed, when the cutter will again be operating along the workpiece in the path established by the pattern. This results in rounded corners instead of the sharp well defined corners called for by the pattern.

Such deviation can be compensated for by utilizing a rotary cutter of a larger radius to eliminate the radii on the exterior corners of the workpiece. With this expedient, the center of the cutter will follow the arcuate path, but its cutting edge will actually define a sharp corner along the contour of the workpiece. The objection to this arrangement is that the greater the error introduced by the time required for acceleration and deceleration of the movable members of the machine, the greater will be the required radius of the cutter to compensate for this error. Since a larger cutter will produce greater radii at inside corners in the workpiece, it is preferable to decrease the size of the cutter rather than increase it to achieve greater accuracy.

For this reason, the present invention includes provisions for minimizing the error produced during the period of acceleration and deceleration of the movable members of the machine without resorting to the use of larger diameter cutters. This is accomplished by including supplemental drive means adapted to increase the rate of acceleration and deceleration of the movable members of the machine to minimize the cause of this type of error rather than compensate for it, and thereby permit the use of a smaller diameter cutter to improve the general performance of the machine.

It is a general object of the present invention to provide an improved pattern controlled machine tool especially adapted to accurately reproduce a pattern in a workpiece.

Another object of the present invention is to provide a pattern controlled machine tool with an improved tracer mechanism for maintaining the pattern contacting stylus in advance of the cutter in the path of travel to anticipate the pattern contour.

Another object is to provide a pattern controlled machine tool with a tracer mechanism having a pattern contacting stylus movable relative to the cutter in response to the rate of travel of the movable elements of the machine for maintaining the stylus in advance of the cutter in the path of travel.

Another object is to provide a pattern controlled machine tool having a tracer mechanism arranged to automatically adjust the distance of advance of the pattern contacting stylus in accordance with the rate of feed of the cutter along the workpiece.

Another object is to provide a pattern controlled machine tool with a supplementary drive mechanism adapted to increase the rate of deceleration and acceleration of the movable elements of the machine for rapid response to a detection of a change in the contour of the pattern.

Another purpose is to provide a pattern controlled machine tool with an improved tracer mechanism arranged to maintain the tracer stylus in advance of the cutter in the path of travel for anticipating the contour of the pattern, combined with a supplementary drive mechanism adapted to increase the rate of deceleration and acceleration of the movable elements of the machine to render the machine capable of accurate reproduction even under adverse conditions.

A further purpose is to provide an improved pattern controlled machine tool capable of accurately copying a pattern while operating at high speed for rapid production.

A further purpose is to provide an improved pattern controlled machine tool especially adapted to minimize the errors which may occur in a reproducing operation due to several causes.

A further purpose is to simplify the operation of a pattern controlled machine tool while substantially increasing its accuracy.

According to this invention a pattern controlled machine tool is provided with a tracer mechanism having a pattern contacting stylus arranged for movement in two mutually transverse directions conforming to the direction of travel of the two movable members employed in performing the copying operation. Separate positioning motors are connected for moving the stylus in each of the two directions, the positioning motors being responsive to the rate of movement of the movable members of the machine tool to move the stylus in two directions corresponding to the directions of movement of these members, a distance directly proportional to their rate of travel. Such movement of the tracer stylus relative to the cutter is provided for advancing its point of contact with the pattern ahead of the corresponding position of the point of contact of the cutter with respect to the workpiece, the two directions of stylus movement producing a resultant movement in the direction of travel along the pattern, The stylus advance serves to anticipate the pattern contour, detecting a change in pattern contour before the cutter arrives at the corresponding point on the workpiece to compensate for the time delay in effecting a change in the direction of relative movement of the cutter.

To further improve the accuracy of the reproduction, the present invention includes additional corrective means in the form of apparatus particularly effective to minimize the error occurring while the movable elements of the machine are accelerating and decelerating, by serving to increase the rate of deceleration and acceleration. Such apparatus comprises, essentially, supplemental driving mechanism connected to advance the movable elements of the machine while they are being driven by the primary driving mechanism, with the advance occurring in their direction of travel. Thus, while the movable elements are driven by the primary driving mechanism, the supplemental driving mechanism operates to move them an additional small amount, so that while they are traveling in their path of movement in a direction established by the primary driving mechanism, the supplemental driving mechanism positions them a slight distance in advance of the position determined by the primary driving mechanism, and operates to advance them a distance directly proportional to their individual rates of travel. Therefore, the greater the rate of travel of the individual movable elements, the greater the distance they are advanced by the supplemental driving mechanism. Since the movable elements are advanced in their direction of travel, the effect of the arrangement is to cause an equal advance of both the tracer stylus and cutter in their respective paths of travel ahead of the position to which they would be driven by the primary driving mechanism alone.

For example, it will be assumed that one of the movable members is traveling at its maximum rate for the established feed rate, and a 90° corner is encountered in the pattern, necessitating the complete stoppage of this member. Since it is traveling at a maximum rate, the supplemental driving mechanism has advanced it a maximum amount. As the primary driving mechanism operates to decelerate the movable member, the supplemental driving mechanism responds to the deceleration and begins to withdraw the movable member from its advanced position. Therefore, it actually begins to drive it a slight distance in a direction opposite to its direction of movement while the primary driving mechanism is decelerating it, to assist in the decelerating operation and thereby effect a substantial increase in the rate of deceleration. In a similar manner, the supplemental driving mechanism functions in the opposite direction to increase the rate of acceleration of the movable elements of the machine.

The foregoing and other objects of this invention, which will become more fully apparent from the following detailed description, may be achieved by means of the exemplifying apparatus depicted in and set forth in this specification in connection with the accompanying drawings, in which:

Fig. 2 is a view in front elevation of the tracer mechanism shown assembled to the machine tool in Fig. 1;

Fig. 3 is a plan view of the tracer mechanism depicted in Fig. 2;

Fig. 4 is a view in left side elevation of the apparatus illustrated in Fig. 2, with parts broken away to clearly show the operating mechanism;

Fig. 5 is a view partly in elevation and partly in vertical section taken along the plane represented by the line 5—5 in Fig. 2;

Fig. 6 is a fragmentary perspective view partly diagrammatic, of a pattern controlled machine tool incorporating supplementary driving mechanism for advancing the movable elements of the machine to illustrate the second feature of the present invention;

Fig. 7 is a fragmentary perspective view partly diagrammatic illustrating a pattern controlled machine tool incorporating the movable tracer stylus shown in Fig. 1 and the supplemental driving mechanism shown in Fig. 6 with the operating mechanism of the transmission shown diagrammatically in detail;

Fig. 12 is a diagrammatic view showing the cutter and tracer stylus superimposed to illustrate their relative positions as they travel along the workpiece and pattern respectively; and Fig. 13 is a diagrammatic view illustrating the movement of the tracer stylus as it travels along the contour of the pattern.

Figure 1:
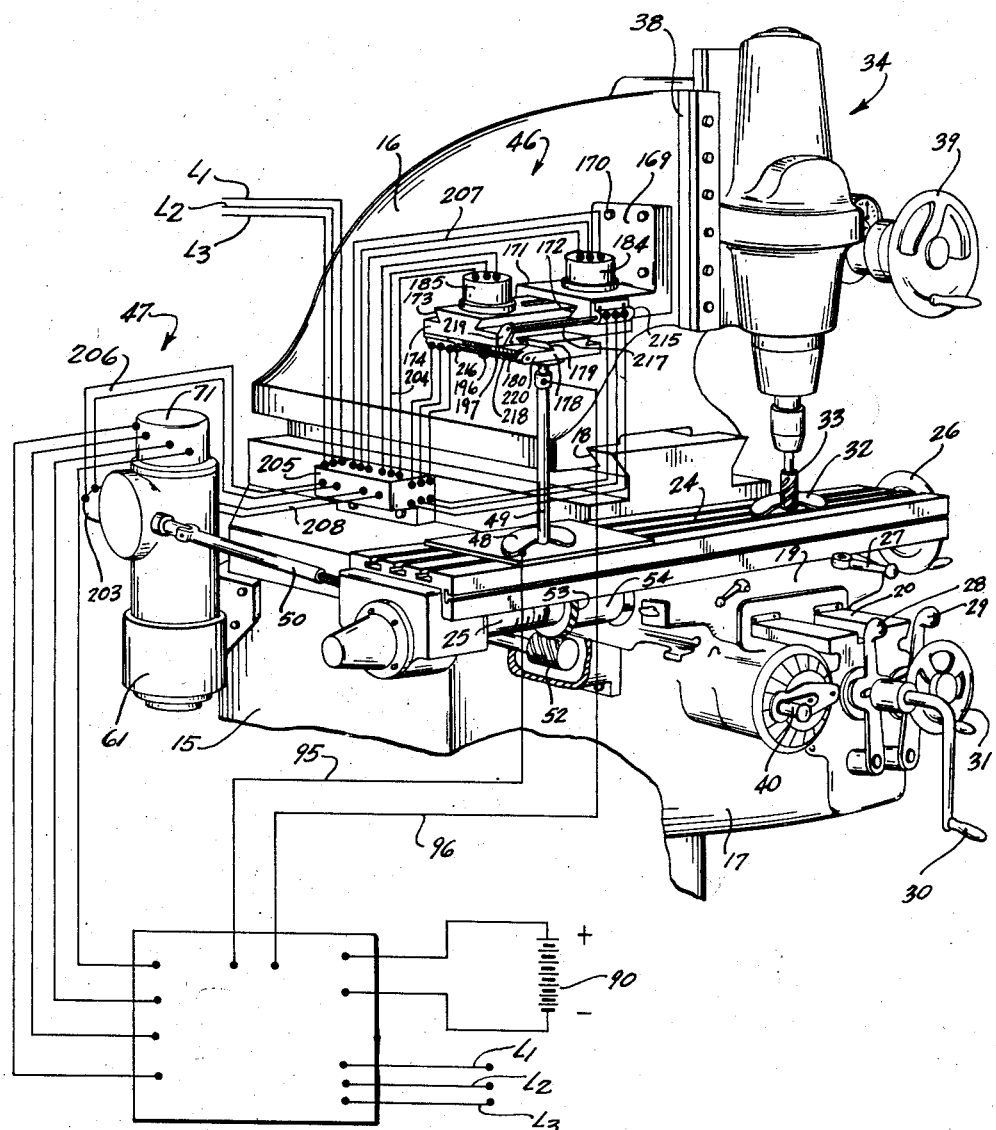
Figure 1 is a fragmentary perspective view partly diagrammatic of a pattern controlled machine tool incorporating a tracer stylus mounted for movement relative to the cutter to illustrate one feature of the present invention.

Referring more specifically to the drawings, the teachings of the present invention are there shown embodied in a conventional milling machine adapted for performing duplicating operations. The machine is shown in Fig. 1 comprising a base 15 that serves as a support for a carriage 16 and a knee 17. The carriage 16 is mounted on the top of the base 15 for movement in a horizontal plane, being guided in its path of movement by ways 18. The knee 17 is carried by the base 15 for movement in a vertical path, and is guided along its path of travel by suitable ways (not shown) provided on the front face of the base.

The knee 17 supports a saddle 19 for movement in a horizontal plane in a path substantially parallel to the path of movement of the carriage 16. The top of the knee 17 is shaped to form ways 20 which guide the saddle 19 in its path of travel. The saddle 19, in turn, carries a table 24 for longitudinal movement in a direction transverse to the direction of movement of the carriage 16, suitable ways (not shown) being formed in the top of the saddle 19 for guiding the table 24 in its path of movement.

Movement of the table 24 is effected by rotating a screw 25, either manually by revolving a handwheel 26, or by power in the conventional manner under the control of a lever 27. The knee 17 and saddle 19 may also be actuated in their path of movement by power in either direction, being arranged to be connected for power movement by manipulating a pair of control levers 28 and 29 respectively. Manual movement of the knee 17 is produced by turning a handle 30, while the saddle 19 may be actuated in its path of movement manually by revolving a handwheel 31.

The table 24 carries a workpiece 32 in position for engagement by a cutter 33 which is rotatably supported by a spindle head generally denoted by the numeral 34. The front face of the carriage 16 is provided with ways 38 for slidably supporting the spindle head 34 for vertical movement, and the spindle head may be actuated in its path of movement by rotating a handwheel 39. The spindle head 34 rotatably supports the cutter 33 in position to operate upon the workpiece 32 mounted on the table 24. Power for rotating the cutter 33 is obtained from a motor (not shown), the power being transmitted to the cutter in a well known manner.

A variety of movements have been provided in the machine shown in the drawings, only two of which are utilized for performing the reproducing operation. These two movements are the movement of the carriage 16 and the movement of the table 24, the direction of travel of these two members being in two mutually transverse paths. The other movements have been provided to facilitate setting the machine for the reproducing operation, and to enable it to be utilized as a conventional milling machine. To this end, a feed rate selector lever 40 is provided for the purpose of selecting the rate of travel of the several movable elements when they are power driven for normal milling operations other than reproducing.

The reproducing system is supported on the exterior of the machine, and comprises a tracer mechanism generally denoted by the numeral 46, and a ball transmission generally indicated by the reference numeral 47 which is of the type described in my copending patent application, Serial No. 315,034, filed on October 16, 1952. The tracer mechanism 46 cooperates with a pattern 48 mounted on the table 24 in position to be engaged by a stylus 49. The reproducing system controls the operation of the machine when it is copying the contour of the pattern 48, and the conventional power drives (not shown) are then rendered inoperative. On the other hand, when normal milling operations are to be performed on the machine, the reproducing system is decommissioned, and the conventional power drives are utilized for operating the several movable elements.

It is to be understood that the features of the present invention may be utilized with a variety of transmissions or other feed drives arranged to be operated under the control of a pattern for performing copying operations. The illustration of the ball transmission 47 is for exemplary purposes only, to show a practical embodiment of the present invention. For the purpose of clarifying the operation of the machine, a general description of the ball transmission 47 will be presented from the diagrammatic view in Fig. 7, where only the principal parts of the transmission are shown, and are illustrated schematically. For a more detailed description of this transmission, attention is invited to the previously mentioned copending patent application, Serial No. 315,034, filed on October 16, 1952.

The ball transmission 47 includes two output shafts 50 and 51, the output shaft 50 being connected to drive the table 24 in its path of movement, and the output shaft 51 being connected to drive the carriage 16 in its path of travel. The output shaft 50 has driving connection with a worm 52 journalled in the saddle 19 and having meshing engagement with a wormwheel 53 fixed to a nut 54 which is in threaded engagement with the screw 25 and journalled in the saddle 19 so that it is not axially displaceable. The screw 25 is carried by the underside of the table 24 and is prevented from rotating in response to the rotation of the nut 54 so that the table will be driven in its path of movement upon actuation of the nut 54 by the worm 52.

Figure 9:
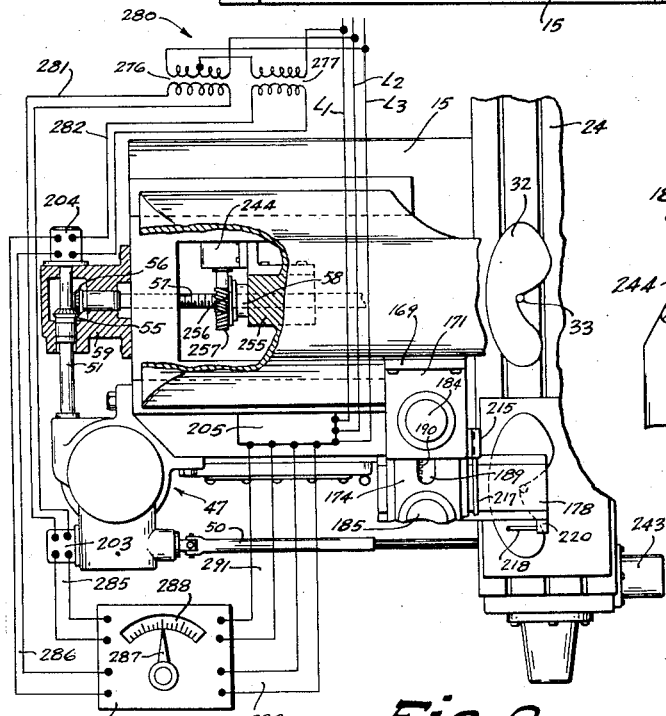
Fig. 9 is a fragmentary plan view of the machine tool depicted in Fig. 8, with parts broken away to reveal the interior mechanism, and a diagrammatic view of a modification of the electrical circuit shown in Fig. 1 superimposed thereon.

The output shaft 51 extends from the ball transmission 47 into a housing 59 as depicted in Fig. 9, where it is provided with a bevel gear 55 having meshing engagement with a cooperating bevel gear 56 to form a driving connection. The bevel gear 56 is keyed to the rearwardly extending end of a screw 57 rotatably supported in the base 15, and having threaded engagement with a nut 58 which is carried by the carriage 16 and prevented from rotating in response to rotation of the screw 57. Therefore, as the screw 57 is rotated, it causes a movement of the carriage 16 by reason of its threaded engagement with the nut 58.

Referring now more particularly to the diagrammatic view in Fig. 7, the ball transmission comprises a ball 60 which is rotated by a motor 61 illustrated in Fig. 1. The motor 61 is connected to rotate a drive wheel 67 which is in frictional driving engagement with the ball 60. In addition to being rotatable about its own axis by the motor 61, the drive wheel 67 is rotatable bodily, to change the position of its axis of rotation, and thereby change the position of the axis of rotation of the ball 60.

The rotation of the ball 60 is utilized for driving the shafts 50 and 51, the rotation of the ball being resolved between these two shafts in a sine-cosine relationship. Power for driving the shafts 50 and 51 is taken from the ball 60 by a pair of power take-off wheels 63 and 64, the take-off wheel 63 being connected to drive the table 24 in its path of movement, and the take-off wheel 64 being connected to drive the carriage 16 in its path of movement, as shown diagrammatically in Fig. 7.

The ball 60 is retained in position, and in frictional driving engagement with the drive wheel 67, and the take-off wheels 63 and 64 by three idler wheels. Two of these idler wheels 65 and 66 are in contact with the ball 60 at points diametrically opposite the point of engagement of the power take-off wheels 63 and 64 respectively, to retain the ball in driving engagement with these power take-off wheels. In like manner, an idler 62 is in contact with the ball 60 at a point diametrically opposite the point of contact with the drive wheel 67, to retain the ball in driving engagement with it.

The drive wheel 67 is rotated bodily by a steering motor 71 to change the position of its axis of rotation, with the motor 71 operating under the control of the tracer mechanism 46 in a manner to be subsequently described. Since the idler 62 is diametrically opposite the drive wheel 67, and functions to maintain the ball in tight driving engagement with the drive wheel 67, both of these wheels must be retained in alignment. For that reason, the idler wheel 62 is connected to rotate bodily, simultaneously with the bodily rotation of the drive wheel 67. To this end, a spur gear 72 is secured to a bracket 73 in which the idler wheel 62 is rotatably mounted. The bracket 73 is connected to be revolved by a shaft 74 connected to be driven by the motor 71. The spur gear 72 has meshing engagement with a cooperating spur gear 75 fixed to the upper end of a vertical shaft 76 which is journalled in the transmission housing. The lower end of the vertical shaft 76 has fixed to it another spur gear 77 disposed for meshing engagement with a cooperating spur gear 78, the latter being fixed to a bracket 79 which rotatably supports the drive wheel 67. By reason of this arrangement, the drive wheel 67 steers in unison with the idler wheel 62 as it is being driven by steering motor 71 so that the two wheels are maintained in operating alignment.

From the above description of the general construction of the ball transmission 47 it is apparent that when the drive wheel 67 is revolved about its horizontal axis, it will cause the ball 60 to revolve, and the axis of rotation of the ball 60 will be parallel to and in the same plane as the axis of rotation of the drive wheel 67, and the idler wheel 62, this being true regardless of the position that the axis of the drive wheel 67 is turned to by the steering motor 71. The power take-off wheels 63 and 64 being in frictional contact with the ball 60, will be driven with a peripheral speed equal to the surface speed of that part of the ball 60 that they are in contact with. This speed will vary as the cosine of the angle that the axis of rotation of the ball 60 makes with the axis of the driven power take-off wheels 63 and 64.

Because of this sine-cosine relationship between the speeds of the two power take-off wheels 63 and 64, the table 24 and the carriage 16, which receive their power from the two take-off wheels, will also travel at feed rates in a sine-cosine relationship. Such an arrangement is ideal for reproducing machines, for effecting movement in two paths, as it establishes a substantially constant rate of feed of the cutter along the workpiece. Thus, as the axis of rotation of the ball 60 is changed to increase the speed of the carriage 16, the speed of the table 24 is decreased proportionately, and vice versa. At a maximum speed of either one of the two members 16 or 24, the other member will remain stationary.

Figure 11:
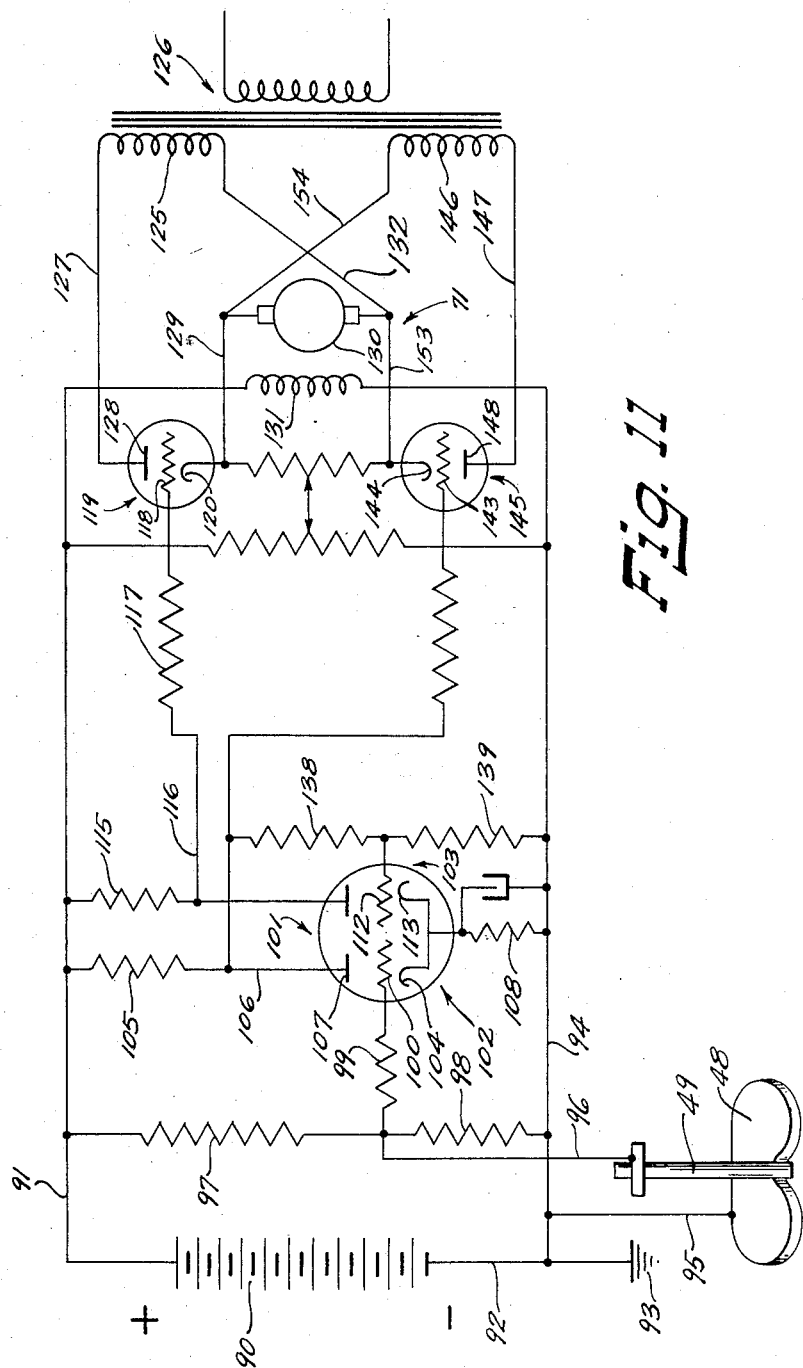
Fig. 11 is a schematic circuit diagram of the electrical system for controlling the operation of the transmission in response to the contour of the pattern.

The steering motor 71 regulates the distribution of power to the output shafts 50 and 51 of the ball transmission 47 in response to the contour of the pattern 48 by reason of its connection in the electrical circuit illustrated diagrammatically in Fig. 11. The pattern 48 and the stylus 49 are electrically conductive, and form an integral part of the electrical circuit, functioning in the manner of a switch to control the direction of rotation of the motor 71, so that when the stylus 49 and pattern 48 are in contact to close the circuit, the motor 71 operates in one direction, and when these members are out of contact, the circuit is broken to cause the motor 71 to operate in the other direction. This arrangement serves to cause the steering motor 71 to steer the drive wheel 67 so that the output shafts 50 and 51 drive the table 24 and carriage 16 respectively to cause the stylus 49 to follow the contour of the pattern 48, and the cutter 33 to reproduce the pattern in the workpiece 32.

As illustrated in Fig. 11, the control voltage for regulating the operation of the motor 71 is obtained from a direct current source 90 having a line 91 connected to its positive side, and a line 92 connected to its negative side. The line 92, in turn, is connected to a ground 93, and has connected to it a line 94 which carries the negative side of the circuit. The pattern itself is electrically conductive, and is connected to the negative line 94 by a conductor 95, while the tracer stylus 49 has electrical connection with a conductor 96, the latter being connected between a pair of resistors 97 and 98 which are serially connected across the lines 91 and 94.

There is also connected between the resistors 97 and 98, one end of a resistor 99 having its other end connected to a grid 100 of a double triode vacuum tube generally denoted by the numeral 101, one unit of which is identified in the drawing by the numeral 102, and the other unit being identified by the numeral 103. When the stylus 49 is out of engagement with the pattern 48, the voltage on the grid 100 is more positive with respect to the cathode 104, so that the current will flow through the unit 102 of the double tube 101. The current flows from the line 91, through a resistor 105 and a conductor 106 to an anode 107, and then to the cathode 104 and a resistor 108 to return to its source through the lines 94 and 92.

While the unit 102 of the tube 101 is conducting current, a grid 112 of the other unit 103 is negative with respect to its associated cathode 113 so that there is no flow of current through the unit 103. Since the unit 103 of the tube 101 is not conducting, the positive voltage connects from the line 91 to a resistor 115, and then through a conductor 116, and another resistor 117 to a grid 118 of an electronic tube generally denoted by the numeral 119. This voltage on the grid 118 of the electronic tube 119 with respect to its cathode 120 causes the tube to become conductive and permit a flow of electrical energy from a secondary coil 125 of a transformer 126, through a conductor 127 to an anode 128 of the tube 119, and thence to the cathode 120. From the cathode 120 the flow of current continues through a conductor 129 to an armature 130 of the direct current motor 71 which has its field 131 connected across the direct current lines 91 and 94. From the armature 130 the current flows into a conductor 132 to return to its source represented by the secondary coil 125 of the transformer 126. With the motor 71 thus energized it functions to steer the drive wheel 67 in a direction to cause relative movement between the pattern 48 and the stylus 49 for moving the stylus 49 into contact with the pattern 48.

When this occurs, the resistor 98 is by-passed to connect the resistor 97 directly to the negative line 94 through the conductor 96, to reduce the positive voltage on the grid 100 and render it more negative with respect to the cathode 104 and stop the flow of anode current across the unit 102 of the tube 101. When the anode current stops flowing through this unit 102 of the tube 101, the voltage on the grid 112 with respect to its cathode 113 becomes more positive due to an increase in current flow through a pair of serially connected resistors 138 and 139 to the ground 93 by way of the line 94 as occasioned by the increased potential of the anode 107 when unit 102 is non-conductive. Such change in the voltage on the grid 112 renders the unit 103 of the tube 101 conductive. As the unit 103 of the tube 101 begins to conduct electricity, the voltage of the grid 118 becomes more negative with respect to its cathode 120, and the tube 119 ceases conducting to terminate the armature current, and therefore the torque of the motor 71 in a direction to move the stylus 49 into engagement with the pattern 48.

However, termination of the flow of current from the anode 107 to the cathode 104 of the unit 102 of the tube 101 causes a decrease in voltage across the load resistor 105 to cause a grid 143 to become more positive with respect to its cathode 144 and permit current flow through a tube 145. When the tube 145 is rendered conductive, it completes an electrical circuit originating at a source represented by a secondary coil 146 of the transformer 126, and continues through a conductor 147 to an anode 148 of the tube 145. From the anode 148 the current flows to the cathode 144, and thence through a conductor 153 into the armature 130. From the armature 130 the current returns to its source through a conductor 154 to the secondary coil 146.

It will be noted that with the tube 145 conducting, the current through the armature 130 is in a reverse direction from that when the tube 119 is conducting the opposite flow of armature current, causing a torque reversal. Such reversal of the motor 71 causes it to steer the drive wheel 67 in a direction resulting in relative motion of the stylus 49 away from the pattern 48 to break contact therewith. As soon as the stylus 49 is moved out of communication with the pattern, the previously described conditions again exist to cause another reversal of the armature current to reverse the direction of motor rotation and effect a return movement of the stylus 49 into engagement with the pattern. Thus, the stylus is vibrating into and out of engagement electrically with the pattern at a very rapid rate due to the rapid action of the tubes in the control circuit to produce what may be termed a buzzing action.

The operation of this control circuit controls the steering motor 71 to direct the relative motion of the stylus 49 along the periphery of the pattern 48, and while it is progressing along the contour of the pattern, it is vibrating into and out of engagement with the pattern to follow a path somewhat similar to the path of movement illustrated in Fig. 13. However, the amount of movement away from the pattern 48 is shown greatly exaggerated in Fig. 13 for the purpose of clarifying the description. In actual practice, the amount of movement of the stylus 49 away from the pattern 48 is of a minute degree, barely perceptible. The cutter 33, of course, moves with the stylus 49 and reproduces the contour of the pattern in the workpiece 32, and the movement of the stylus 49 into and out of engagement with the pattern causes a similar movement of the cutter 33 with respect to the workpiece 32, but the movement is so slight that it is hardly noticeable in the completed workpieces. If the resulting ripple in the surface of the workpiece is objectionable, it may be readily removed by a polishing operation.

In addition to the directional control exercised over the motor 71 by the voltage impressed upon the grids 118 and 143, the motor is further controlled by its own counter electromotive force, which functions to prevent its overrunning. For example, it will be assumed that the stylus 49 is not in contact with the pattern 48 so that a voltage is impressed upon the grid 118 of the tube 119 to render the tube conductive. With the tube 119 conducting, the armature circuit is closed, as previously described, for rotating the armature 130 in a direction to move the stylus 49 into engagement with the pattern. The flow of current through the tube 119 depends upon the voltage of the grid 118 being relatively more positive with respect to the voltage upon the cathode 120. As the flow of current through the tube 119 continues, the speed of the motor 71 increases. However, as the speed of the motor increases, its counter electromotive force increases proportionately, to increase the voltage upon the cathode 120 so that it approaches the voltage of the grid 119, and thereby reduces the difference in potential between the grid 118 and the cathode 120 to limit the flow of current through the tube.

If the motor 71 was connected for unidirectional operation, its counter electromotive force would serve to govern the speed of the motor, preventing it from attaining excessive speeds. Since the direction of rotation of the motor 71 is alternating rapidly in the present arrangement, the effect of its counter electromotive force is to prevent the motor from overrunning its movement in either direction. Since the difference of potential between the grid 118 and the cathode 120 is limited by the counter electromotive force of the motor 71, it requires only a slight decrease in the positive voltage on the grid 118 with respect to the cathode 120 to stop the flow of current through the tube 119 and terminate the torque of the motor 71. This results in a faster response of the motor to the signal of the stylus 49, and a greater frequency of vibration of the stylus for smoother operation.

Upon a reversal of the direction of rotation of the motor, its counter electromotive force is impressed upon the cathode 144 of the tube 145. This results in the same effect on the conductivity of the tube as described above for the tube 119. Thus, the same effect is achieved in either direction of rotation of the motor 71.

With the pattern 48 and stylus 49 connected in the electrical circuit depicted in Fig. 11, the operation of the steering motor 71 is controlled in accordance with the contour of the pattern to regulate the movement of the table 24 and the carriage 16 so that a relative movement is effected causing the stylus 49 to progress along the contour of the pattern 48, the cutter 33 moving with it to reproduce the pattern in the workpiece 32.

For a better understanding of this operation, reference is made to Fig. 13 where the stylus 49 is shown progressing along the contour of the pattern. It will be assumed that the relative movement of the stylus 49 along the pattern is in a clockwise direction or from left to right as viewed in Fig. 13. Therefore, the stylus 49 is first traveling along a straight portion 159 of the pattern in a true easterly direction, assuming that the arrow 160 indicates a northerly direction of movement.

To achieve this movement, the drive wheel 67 of the ball transmission 47 is positioned 90° from the position shown in Fig. 7 so that it is parallel with the power take-off wheel 63. In this position it will be rotating the ball 60 about an axis parallel with the axis of rotation of the power take-off wheel 63 to produce maximum rotation of the take-off wheel 63 and thereby revolve the output shaft 50 at its maximum rate while the power take-off wheel 64 will be receiving no power, and its associated output shaft 51 will not be operating. Therefore, all the power is being transmitted to the table 24 to drive it at its maximum rate of movement while the carriage 16 remains stationary. Thus, the table 24 is being actuated to the left as viewed in Fig. 7 to effect a relative movement between the stylus 49 and the straight line portion 159 of the pattern, causing the stylus 49 to progress in an easterly or rightward direction as viewed in Fig. 13.

However, since the torque of the motor 71 is being constantly reversed at a very rapid rate by reason of its connection in the electrical circuit shown in Fig. 11, the stylus 49 will not remain in contact with the straight line portion 159 of the pattern, but rather will move a slight amount into and out of engagement with the pattern as it progresses along its contour. The stylus 49 will therefore take a path indicated by a broken line 161 shown in Fig. 13. The movement of the stylus 49 away from the pattern in this view is shown greatly exaggerated for the purpose of clarity, but it is to be understood that such movement is only in the order of fractions of a thousandth of an inch by virtue of the rapid reaction of the electrical circuit shown in Fig. 11 to the closing and opening of the electrical circuit between the pattern 48 and the stylus 49.

The relative movement of the stylus 49 into and out of engagement with the pattern 48 is caused by the oscillation of the drive wheel 67 of the ball transmission 47 in response to the constant torque reversal of the motor 71. Thus, in the first position of the stylus 49 in Fig. 13, it is shown in contact with the pattern, causing a flow of current through the stylus 49 and pattern 48 as previously described in connection with the electrical circuit shown in Fig. 11. This causes energization of the motor 71 in a direction to steer the drive wheel 67 in a clockwise direction as viewed from the top in Fig. 7.

Such steering movement of the drive wheel 67 functions to change the position of the axis of rotation of the ball 60 slightly to reduce the rate of rotation of the take-off wheel 63 a very small amount, while causing the take-off wheel 64 to rotate at a very slow rate in a clockwise direction as seen in Fig. 7. Therefore, the rate of travel of the table 24 is decreased slightly, while at the same time the carriage 16 is moved toward the back of the machine at a very slow rate to cause a northward movement of the stylus 49, moving it away from the pattern, and breaking the electrical connection between the conductors 96 and 95. The stylus 49 is then out of contact with the pattern as shown diagrammatically in its second position in Fig. 13.

When the electrical contact between the stylus and the pattern is broken, the electrical circuit reacts immediately to reverse the torque of the motor 71, causing it to steer the drive wheel 67 in the opposite or counterclockwise direction as viewed from the top in Fig. 7. As the drive wheel 67 moves past the plane in which the take-off wheel 63 is located, it changes the axis of rotation of the ball 60 to reduce the rate of rotation of its take-off wheel 63 a barely perceptible amount, and at the same time initiates rotation of the take-off wheel 64 at a comparatively slower rate in a counterclockwise direction as viewed in Fig. 7.

It will be noted that this direction of rotation of the take-off wheel 64 is opposite to its direction of rotation when the drive wheel 67 was steered in an opposite or clockwise direction. Therefore, such rotation of the take-off wheel 64 will cause a slow movement of the carriage 16 forwardly, to move the stylus 49 toward the pattern shown in Fig. 13. Such movement will continue until the stylus 49 makes electrical contact with the surface 159 of the pattern to again cause reversal of the torque of the motor 71. The electrical circuit will again react to the electrical contact of the pattern and stylus to regulate the ball transmission 47 so that it will cause a movement of the stylus 49 away from the pattern.

The stylus 49 will in this manner be moved alternately into and out of engagement with the pattern at a very rapid rate as it progresses along its contour. As the stylus 49 travels along the straight portion 159 of the pattern the rate of rotation of the take-off wheel 63 will deviate only slightly from a constant rate, and the take-off wheel 64 will be reversed rapidly to rotate it in each direction just sufficiently to bring the stylus into and out of engagement with the pattern. The apparatus will continue to operate in this manner, until the stylus 49 arrives at a surface 162 which departs 45° from the position of the surface 159.

As the stylus negotiates the corner when arriving at the surface 162, the steering motor 71 will be operated to progressively steer the drive wheel 67 a greater amount in a clockwise direction, to increase the rotation of the take-off wheel 64 for moving the carriage 16 a greater amount in a forward direction to bring the stylus 49 into contact with the pattern. When the corner is negotiated, and the stylus 49 is traveling along the 45° surface 162 of the pattern, the drive wheel 67 will be disposed substantially in a plane 45° in a counterclockwise direction from the plane of the take-off wheel 63. As the torque of the motor 71 is reversed, as previously described, it will cause the drive wheel 67 to oscillate to either side of this position. The table 24 will then be driven to the left, as viewed in Fig. 7, and the carriage 16 will be driven forwardly with both of these elements moving at an equal rate in their respective paths of movement.

Thus, in the sixth position of the stylus 49 in Fig. 13 it is shown out of contact with the pattern. With the electrical contact thus broken, the motor 71 will be energized to steer the drive wheel 67 in a counterclockwise direction. As it moves in this direction, it causes the axis of rotation of the ball 60 to increase the speed of rotation of the take-off wheel 64, and decrease the rate of rotation of the take-off wheel 63. Therefore, it effects an increased rate of travel of the carriage 16, and a decreased rate of travel of the table 24 to move the stylus 49 toward the pattern until it makes electrical contact therewith as shown in its seventh position in Fig. 13.

With the stylus 49 making electrical contact with the pattern, the torque of the motor 71 is again reversed to reverse the direction of steering of the drive wheel 67 and thus effect an increase in the rate of rotation of the take-off wheel 63, and a decrease in the rate of rotation of the take-off wheel 64, to thereby again cause a relative movement of the stylus 49 away from the pattern. Thus, it will be noted that for the stylus 49 to travel along the 45° surface 162 requires an equal movement of the table 24 and the carriage 16, and as the stylus 49 progresses, the rate of movement of the carriage 16 and table 24 will deviate only slightly from these established rates.

In this manner the stylus 49 is caused to move into and out of engagement with the pattern as it continues along its contour to make and break the electrical contact between these two elements. Since the cutter is mounted for movement with the stylus 49, and the workpiece upon which it operates is supported by the table 24 as is the pattern, the same relative movement is effected between the cutter and the workpiece, so that the pattern is duplicated in the workpiece.

The machine illustrated in Fig. 1 is shown equipped with the tracer mechanism 46 which embodies a portion of the teachings of the present invention, being especially adapted to automatically maintain the stylus in advance of the cutter in their respective paths of travel an amount directly proportional to the rate of travel of the cutter with respect to the workpiece. As previously mentioned, such advance is provided for the purpose of compensating for the time lag which exists from the instant the tracer detects a change in the pattern contour to the time when the direction of relative movement of the cutter is changed accordingly. It will be noted that the tracer stylus 49 and the cutter 33 are both supported by the carriage 16 for simultaneous movement therewith, and likewise the pattern 48 and workpiece 32 are both supported by the table 24.

Therefore, a combined movement of the carriage 16 and table 24 to cause a relative movement of the stylus 49 along the pattern 48 produces an identical movement of the cutter 33 with respect to the workpiece 32 so that the pattern is duplicated in the workpiece. However, the stylus 49 is supported on the carriage 16 for a slight movement relative to the cutter 33 for the purpose of advancing it a small amount ahead of the cutter in the path of travel to obtain the anticipating effect previously referred to for improving the accuracy of the reproduction. The amount of such advance is made dependent upon the rate of travel of the carriage 16 and table 24 which serves the twofold purpose of maintaining the advance in the direction of travel of the stylus and cutter, and of varying the distance of advance so that it is directly proportional to the rate of travel of the cutter along the workpiece as will be presently seen.

The apparatus for producing the above effect constitutes the tracer mechanism 46 which comprises an L-shaped bracket 169 fixed to the side of the carriage 16 by suitable screws 170. The bracket 169 is L-shaped to present a horizontally extending leg 171 having its underside formed to constitute ways 172 as seen in Figs. 1 and 5. These ways 172 cooperate with matching ways 173 formed on the upper surface of a slide 174 to slidably support the slide for movement relative to its supporting bracket 169. The ways 172 are substantially parallel to the path of travel of the table 24 so that the movement of the slide 174 is in a proper direction relative to the direction of the table 24, and, as will be seen, it carries the stylus 49 with it in this direction of movement relative to the cutter 33.

Movement of the stylus 49 relative to the cutter 33 in a direction parallel to the path of travel of the carriage 16 is obtained by a slide 178 from which the stylus 49 extends to engage the pattern 48. The upper surface of the slide 178 is formed to provide ways 179 disposed to engage cooperating ways 180 formed on the underside of the slide 174 in a direction transverse to the position of the ways 173 formed on the upper surface of the slide 174.

Thus, the tracer mechanism 46 supports the stylus 49 for movement relative to the cutter 33 in two mutually transverse directions, corresponding to the directions of movement of the carriage 16 and table 24. Obviously, therefore, the stylus 49 may be moved relative to the cutter in any desired direction by a movement of either one of the slides 174 or 178, or by a combined movement of both of these slides to effect a resultant movement in the desired direction.

Movement of the two slides in their path of travel is effected by a pair of positioning motors 184 and 185, the motor 184 being connected to actuate the slide 174, and the motor 185 being connected to drive the slide 178. The driving connection between the motors 184 and 185 and their associated slides 174 and 178 respectively, is clearly shown in Figs. 2 to 5 inclusive where the motor 184 is shown mounted on the top surface of the horizontal leg 171 of the bracket 169. It has a depending drive shaft 186 extending through a bore 187 formed in the horizontal leg 171. The end of the drive shaft 186 is provided with a pinion 188 arranged to rotate with the drive shaft 186 and disposed within a slot 189 formed in the top surface of the slide 174 extending longitudinally thereof between its ways 173. The pinion 188 has meshing engagement with a gear rack 190 secured to the side of the slot 189 in position to cooperate with the pinion 188.

The positioning motor 185 is similarly connected to drive the slide 178 in its path of travel. It is mounted on the top surface of the slide 174, and has a depending drive shaft 194, as best seen in Fig. 4, extending through a bore 195 formed through the slide 174. A pinion 196 is fixed to the extending end of the drive shaft 194 so that it is disposed beneath the slide 174 in position to mesh with a gear rack 197 attached to the edge of the slide 178. Thus, energization of the motor 185 will cause a rotation of the pinion 196 to effect a movement of the slide 178 by reason of the meshing engagement of the gear rack 197 with the pinion 196.

As previously mentioned, the amount of advance of the stylus 49 ahead of the cutter 33 is directly proportional to the rate of travel of the cutter 33 along the workpiece 32 in a direction corresponding to the direction of travel of the stylus 49 along the pattern 48. To achieve this relationship, the slide 174 is rendered responsive to the direction and rate of travel of the table 24 so that it moves an amount directly proportional to the rate of travel of the table 24 at any one instant.

However, movement of the table 24 does not cause a movement of the stylus 49, but rather effects a movement of the pattern 48 with respect to the stylus. Therefore, relatively speaking, to produce a movement of the stylus 49 along the pattern 48 in an easterly direction, the table 24 must be moved in a westerly direction. Thus in Fig. 13, the stylus 49 was described as progressing along the surface 159 in an easterly direction, but such easterly movement is actually effected by moving the table 24 in the opposite or westerly direction. Therefore, since it is desired to advance the stylus 49 ahead of the cutter, in the direction of stylus and cutter movement relative to the pattern and workpiece respectively, the stylus 49 will be advanced in a direction opposite to the direction of travel of the table 24. Thus, the table 24 will be traveling in a westerly direction to effect a relative movement of the stylus 49 along the surface 159 in Fig. 13, in an easterly direction. And, since the stylus 49 is progressing in an easterly direction relative to the pattern, it will be advanced in an easterly direction, or in a direction opposite to the direction of movement of the table 24, the distance of such advance being directly proportional to the rate of travel of the table 24.

Likewise, the slide 178 is responsive to the rate and direction of travel of the carriage 16 so that it moves an amount proportional to the rate of travel of the carriage 16, but in the same direction as its direction of travel rather than the opposite direction because the stylus 49 is supported to the carriage 16. Since the carriage 16 supports the stylus 49, its movement causes a corresponding movement of the stylus 49 while the table 24 moves the pattern instead. Therefore, the opposite arrangement is necessary so that the stylus 49 will be advanced in the same direction as the direction of travel of the carriage 16. Thus, the stylus 49 is moved in two mutually transverse directions in an amount and direction depending upon the direction and rate of travel of the carriage 16 and table 24 so that the resultant movement of the stylus 49 is in the same direction as the direction of travel of the cutter 33 along the workpiece 32 and in an amount directly proportional to the rate of travel of the cutter 33 along the workpiece 32.

In order to obtain such relationship in the movement of the slides 174 and 178, the instant slide position as produced by the positioning motors 184 and 185 is made dependent upon the rate of rotation of the output shafts 50 and 51 respectively. This is accomplished by providing a pair of tachometer generators 203 and 204 connected to be driven with the output shafts 50 and 51 respectively, as best illustrated in Fig. 9.

The energizing voltage for the positioning motor 184 is obtained from a source represented by the lines $L_1$, $L_2$ and $L_3$. The voltage from the source is directed into a servo motor control box 205 and controlled by the voltage generated by the tachometer generator 203 to regulate the energization of the positioning motor 184. The tachometer generator 203 is mounted on the housing of the ball transmission 47 and is connected to be driven by the ball transmission with the output shaft 50 so that its generated voltage will vary directly with the rate of rotation of the output shaft 50. The voltage generated by the tachometer 203 is transmitted to the servo motor control box 205 by a pair of conductors 206 (Fig. 1) where it serves to produce controlling voltage for the positioning motor 184, transmitted by the conductors 207. Since the servo motor control box 205 is of a type well known in the art and does not form a part of the present invention, it will not be here described.

The tachometer generator 204 is mounted on the outside of the housing 59, in alignment with the output shaft 51 which extends through the housing into driving engagement with the tachometer generator. Therefore, rotation of the output shaft 51 causes a corresponding rotation of the tachometer generator 204 to render its output directly proportional to the rate of rotation of the output shaft 51. The voltage thus generated by the tachometer generator 204 is transmitted to the servo motor control box 205 by a pair of conductors 208 (Fig. 1) where it serves to produce a controlling voltage for the positioning motor 185, transmitted by the conductors 209 to regulate the operation of the positioning motor 185 in the same manner as the tachometer generator 203 regulates the operation of the positioning motor 184. In both instances, the polarity of the voltages generated by the tachometer generators 203 and 204 will reverse with a reversal of the rotation of the output shafts 50 and 51 respectively, to reverse the displacement of the slides 174 and 178 caused by the positioning motors 184 and 185 respectively.

From the above description it is obvious that the values of the voltages transmitted to the positioning motors 184 and 185 will vary directly with the rate of rotation of the output shafts 50 and 51 respectively. Furthermore, the polarity of the signal voltage delivered to cause positioning of the slides 174 and 178 by the positioning motors 184 and 185, and therefore the direction of their displacement, is dependent upon the direction of the rotation of the output shaft 50 and 51. The connections are such that when the output shaft 50 is driving the table 24 to the left as viewed in Fig. 1, the positioning motor 184 will have been actuated to advance the slide 174 to the right a distance directly proportional to the speed of the output shaft 50, and therefore its distance of advance is directly proportional to the rate of travel of the table 24. When the table 24 is being driven to the right as viewed in Fig. 1, the output shaft 50 and therefore the tachometer generator 203 will be driven in the opposite direction to have caused the positioning motor 184 to displace the slide 174 in a leftwardly direction to maintain the advance of the stylus 49 ahead of the cutter 33 in the direction of movement of the cutter 33 along the workpiece 32.

The positioning motor 185 operates in the same manner to produce an advance of the stylus 49 ahead of the cutter 33 in the direction of movement of the carriage 16, and is connected to be controlled by the voltage of the tachometer generator 204 in response to the speed of the output shaft 51 which serves to drive the carriage 16 in its path of travel. Thus, when the ball transmission 47 is functioning to drive the carriage 16 in a forward direction, the tachometer 204 develops a voltage proportional to the rate of travel of the carriage 16, to have caused energization of the positioning motor 185 to produce a displacement of the slide 178 to advance it forwardly, causing the stylus 49 to move ahead of the cutter 33 in the path of travel of the carriage 16. In like manner, if the carriage 16 is being driven in a rearwardly direction, the direction of rotation of the output shaft 51 is reversed, causing the reverse direction of rotation of the tachometer generator 204 to reverse the polarity of the signal voltage and thereby cause the positioning motor 185 to produce a reverse displacement of the slide 178 in a rearward direction for the purpose of advancing the stylus 49 ahead of the cutter 33 in the direction of movement.

Energization of the positioning motors 184 and 185 can result in their continuous operation when traversing a curved contour, and a pair of transducers 215 and 216 are provided in their signal circuits to produce null seeking signal voltages to control the positioning motors and satisfy the displacements required. Such voltage nullifying effect is obtained by the transducers 215 and 216 comprising linear potentiometers of cylindrical configuration arranged to cooperate with a pair of rods 217 and 218 slidable within their bores for varying the respective potentiometer settings. The transducer 215 is mounted on the horizontal leg 171 of the bracket 169, and its cooperating rod 217 is supported at one end by an arm 219 which is fixed to the slide 174, the other end of the rod 217 being disposed within the bore of the transducer 215 which serves to support it.

Similarly the transducer 216 is supported by the underside of the slide 174 while its cooperating rod 218 is attached at one end to an arm 220 carried by the slide 178 to move with it, the other end of the rod 218 being supported within the bore of the transducer 216 for movement therein to vary its potentiometer setting. With such arrangement, movement of the slide 174 produces a similar movement of its associated rod 217 causing the end of the rod to slide within the transducer 215, and thereby vary its potentiometer setting. In like manner, movement of the slide 178 effects a movement of its associated rod 218 within the transducer 216 to thereby change its potentiometer setting.

The rods 217 and 218 have a neutral position in relation to the transducers 215 and 216 respectively, at which point the potentiometer settings are neutral. Movement of the rods 217 or 218 in either direction from this neutral position serves to vary the value of the respective transducer signal voltage. Thus, when the table 24 is at rest, the tachometer generator 203 is not operating. Under this condition, the slide 174 is neutrally disposed, so that the position of the stylus 49 with respect to the pattern 48 coincides with the position of the cutter 33 with respect to the workpiece 32 in the direction of movement of the table 24, there being no advance of the stylus with respect to the cutter in this path of travel.

With the slide 174 in this position, the rod 218 is neutrally disposed with respect to the transducer 215 so that the potentiometer setting is neutral. Actuation of the table 24 in either direction will cause operation of the tachometer generator 203 to effect energization of the positioning motor 184 and advance the slide 174 in a direction opposite to the direction of movement of the table 24. Such movement of the slide 174 will effect a corresponding movement of the rod 217 to produce a change in the potentiometer setting of the transducer 215 to nullify the voltage delivered by the tachometer 203 and terminate operation of the positioning motor 184 after the slide 174 has been moved the desired amount. In like manner, when the carriage 16 is at rest, the potentiometer setting of the transducer 216 is neutral, and any movement of the slide 178 in either direction will move the rod 218 from its neutral position with the respect to the transducer 216 to change its potentiometer setting.

For example, let it be assumed that the pattern calls for a straight line movement requiring the table 24 to travel to the left as viewed in Fig. 1, with the carriage 16 remaining stationary. As such movement is initiated, the ball transmission 47 actuates its output shaft 50 to operate the tachometer generator 203 as previously described. Operation of the tachometer generator 203 serves to transmit the signal voltage to cause energization of the positioning motor 184 and advance the slide 174 in a direction opposite to the direction of movement of the table 24, or to the right as shown in Fig. 1. As the slide 174 moves, it causes a corresponding movement of the rod 217 by reason of its connection therewith, to change the potentiometer setting of the transducer 215 which was neutral when the table 24 was at rest. The changed potentiometer setting of the transducer 215 affords a counteracting signal voltage to oppose the signal voltage transmitted by the tachometer generator 203 until the error signal voltage is nullified and operation of the positioning motor 184 is terminated after the slide 174 has been displaced the desired amount. The slide 174 is thus advanced a predetermined amount depending upon the rate of operation of the tachometer generator 203 which is proportional to the rate of travel of the table 24. The faster the rate of travel of the table 24, the greater is the voltage transmitted by the tachometer generator 203, causing an increased advance of the slide 174 so that its advance corresponds proportionately to the rate of travel of the table 24.

When the contour of the pattern calls for a decrease in the rate of travel of the table 24, the ball transmission 47 is operated to reduce the rate of rotation of its output shaft 50, and as this is done the speed of the tachometer generator 203 decreases accordingly. This decreases the value of the signal voltage transmitted by the tachometer generator 203, and since the transducer 215 still retains its previous potentiometer setting the polarity of the error voltage which effects energization of the positioning motor 184 is reversed to cause a reverse rotation of its output shaft 186 and associated pinion 188 to withdraw the slide 174 from its advanced position so that it moves to the left as viewed in Fig. 1. As the slide 174 moves to the left it moves the rod 217 with it with respect to its associated transducer 215 to produce a new potentiometer setting, reducing the error signal voltage to zero to thereby balance the circuit. When this occurs the operation of the positioning motor 184 terminates to stop further movement of the slide 174.

When the contour of the pattern calls for a movement of the table 24 to the right as viewed in Fig. 1, the output shaft 50 of the ball transmission 47, and therefore the tachometer generator 203 will be operating in a reverse direction. The polarity of the error signal voltage controlling energization of the positioning motor 184 will likewise be reversed, causing a reversal of the torque applied by the positioning motor 184 to effect a movement of the slide 174 in the opposite direction, which is to the left as viewed in Fig. 1. Such movement of the slide 174 will also cause a corresponding movement of its associated rod 217 to the left of its neutral position with respect to the transducer 215, to again vary its potentiometer setting until the signal voltage produced by the tachometer generator 203 is nullified to terminate the operation of the positioning motor 203. When this occurs, the slide 174 will have moved to the left the desired amount to advance the stylus 49 ahead of the cutter 33 in the path of travel of the table 24.

The positioning motor 184 is thus controlled to effect a positioning of the slide 174 in the desired direction, and by a desired amount, to advance the stylus 49 ahead of the cutter 33 in conformity with the rate of travel of the table 24. In like manner, the positioning motor 185 is responsive to the rate and direction of travel of the carriage 16 to position the slide 178 for the purpose of properly advancing the stylus 49 ahead of the cutter 33 in the direction of travel of the carriage 16, which as previously described is transverse to the direction of travel of the table 24.

The error signal voltage for controlling energization of the positioning motor 185 is the difference between the transducer 216 signal voltage and the tachometer generator 204 signal voltage, the tachometer generator 204 being connected to be driven by the output shaft 51 of the ball transmission 47 which is connected to drive the carriage 16 in its path of movement. As the slide 178 is actuated, it moves its associated rod 218 with it to vary the potentiometer setting of the transducer 216. The transducer 216 then acts in the same manner as the transducer 215 to limit the operation of the positioning motor 185.

Obviously, therefore, the stylus 49 is supported by the slides 174 and 178 for movement in two mutually transverse directions. A combination of these two movements will produce a resultant movement in any desired direction, so that the stylus 49 may be advanced ahead of the cutter 33 in its direction of movement relative to the workpiece 32 regardless of what direction the path of travel of the cutter 33 takes relative to the workpiece.

The operation of the positioning motors 184 and 185 to advance the stylus 49 ahead of the cutter 33 in the direction of its movement relative to the workpiece may be readily observed by referring to the diagrammatic view in Fig. 12. This view illustrates the relation of the cutter 33 and the stylus 49 as relative movement is depicted between these members, and the workpiece 32 and pattern 48 respectively. The outline there shown represents both the pattern and the workpiece, with the cutter 33 indicated by a circle depicted by a broken line, while the stylus 49 is indicated as a circle shown by a solid line. For convenience, an arrow 225 indicates a northerly direction of movement, and all other directions of movement will be identified from this reference.

It will be assumed that the direction of movement of the cutter 33 and stylus 49 along the workpiece and pattern respectively is to the right as viewed in Fig. 12, or in an easterly direction, so that the first position of the members is at the left of the figure. At this point, the pattern is a straight line portion 226 in a true east-west direction, calling for a movement of the table 24 to the left at its maximum rate of travel for the particular feed rate setting, with the carriage 16 remaining stationary.

Under these conditions, the tachometer generator 203 will be operating at a maximum rate to produce a maximum signal voltage which results in energization of the positioning motor 185, in a direction to move the slide 174 to the right a maximum distance for the purpose of advancing the tracer stylus 49 the desired amount ahead of the cutter 33 in a true easterly direction as shown in Fig. 12. The amount of such advance is identified by the letter X in Fig. 12, being the distance from the center of the cutter 33 to the center of the stylus 49 as shown. It will be understood that the amount of advance is shown here greatly exaggerated for the purpose of clarity, while in actual operation the amount of such advance will be measured in units of thousandths of an inch.

For the purpose of this description, the stylus 49 and cutter 33 will be considered as proceeding to the right as viewed in Fig. 12, although it is to be understood that in the illustrated embodiment the east-west movement is effected by moving the table 24, the stylus 49 and cutter 33 not being movable in this direction except for the slight movement of the stylus 49 with respect to the cutter 33 by actuation of the slide 174 for advancing the stylus. On the other hand, relative movement of the stylus 49 and cutter 33 in a north-south direction along the pattern and workpiece respectively, is achieved by movement of these members through actuation of the carriage 16.

The stylus 49 and cutter 33 proceed along the straight line portion 226 until a point 227 is reached by the stylus 49. Immediately upon passing the point 227, the stylus 49 is reoriented to accommodate the change in the contour of the pattern, and causes an adjustment of the transmission 47 to change the direction of movement of the stylus 49 and cutter 33 from a true easterly direction to a south-easterly direction along a line 228. Since the cutter 33 lags the stylus 49 by the distance X, the transmission 47 will have responded to the detection of the change in contour of the pattern by the stylus 49 at the time that the cutter 33 reaches the point 227 so that its direction of relative movement will change precisely at that point for accurate reproduction, assuming for the purpose of this description that there is no delay in the acceleration and deceleration of the carriage 16 and the table 24 respectively. Both the stylus 49 and the cutter 33 will then be traveling 45° south of their previous direction of movement along the straight line portion 228.

The change in direction of relative movement of the cutter 33 and the stylus 49 is produced by reducing the rate of travel of the table 24 and initiating movement of the carriage 16 in a southerly direction at a rate corresponding to the new rate of travel of the table 24. This results in a corresponding reduction in the rate of operation of the tachometer generator 203, and initiating operation of the tachometer generator 204 at the same rate as the tachometer generator 203. Thus, the rate of operation of the tachometer generator 203 is reduced proportionately to the reduction in the rate of travel of the table 24 so that the slide 174 which was advanced its maximum distance for the particular feed rate while the straight line portion 226 was operated upon, will be withdrawn or moved to the left as viewed in Fig. 7 to decrease the advance of the stylus 49 ahead of the cutter 33 in an easterly direction.

At the same time the operation of the tachometer generator 204 is initiated since it was inoperative while the cutter 33 was traveling along the straight line portion 226. It will be caused to operate at the same rate as the tachometer generator 203 so that the slide 178 will be advanced forwardly of the machine, or in a southerly direction as viewed in Fig. 12, the same amount as the slide 174 is advanced to the right.

The movement of the slides 174 and 178 to effect the desired advance of the stylus 49 is illustrated diagrammatically in Fig. 12 by superimposing the illustrations of the cutter 33 and stylus 49 in their positions along the line 228 of the pattern and workpiece respectively. Thus, the distance of advance of the slide 174 is represented by the length of an arrow A, while the advance of the slide 178 is represented by the length of an arrow B. The arrows A and B indicate the direction of movement of the slides 174 and 178 respectively, and constitute the two components of the resultant advance of the stylus 49 in the direction of the path of travel, the value of the resultant being represented by the length of an arrow R. Therefore, the actual advance of the stylus 49 ahead of the cutter 33 in the direction of movement, is again represented by the value X since the resultant R is of the same length as the distance X in the first described position of the cutter 33 and stylus 49 along the straight line portion 226.

In the third position of the cutter 33 and stylus 49 in Fig. 12, they are shown proceeding along a straight line 229 in a due south direction. While the cutter 33 is negotiating this portion of the workpiece, the table 24 remains stationary, and the carriage 16 is driven at its maximum rate of travel for the particular feed rate toward the front of the machine. Therefore, the output shaft 50 of the ball transmission 47 and its associated tachometer generator 203 are rendered inoperative so that no voltage is delivered to the positioning motor 184. Since the positioning motor 184 is not being energized, its cooperating slide 174 is disposed in its neutral position for location of the stylus 49 relative to the pattern coincident with the position of the cutter 33 relative to the workpiece 32 in the east-west direction. On the other hand, the output shaft 51 of the ball transmission is driven at a maximum rate, and its associated tachometer generator 204 is therefore also driven at its maximum rate. For this reason, the error signal voltage causes the positioning motor 185 to advance the slide 178 a maximum amount in a southerly direction, or forwardly of the machine, to produce the advance X of the stylus 49 ahead of the cutter 33 in the direction of movement.

In the fourth illustrated position of the cutter 33 and stylus 49 in Fig. 12, they are shown negotiating a straight line portion 230, of the pattern, where they travel in a path parallel to the path of travel in the third illustrated position but in the opposite direction. Therefore, the carriage 16 will be moving rearwardly of the machine instead of forwardly, and the positioning motor 185 will be energized in the opposite direction to move the stylus 49 rearwardly of the machine or to the north as viewed in Fig. 12 to advance it ahead of the cutter 33 the distance X with the slide 174 remaining in its neutral position.

Thus, it will be noted that for a particular feed rate setting of the machine, the distance of advance of the stylus 49 ahead of the cutter 33 as represented by the distance X in Fig. 12, will remain a constant in the direction of movement. This is true regardless of whether the advance X of the stylus 49 is produced by movement of only one of the slides 174 or 178, or whether it is produced by a combined movement of the two slides to establish a resultant movement in the desired direction. If the rate of travel of the stylus 49 and cutter 33 about the contour of the pattern and workpiece is changed, the value of the advance X will also be changed proportionately, but will always remain constant for any particular feed rate setting.

Thus, it is obvious from the above description that the stylus 49 is rendered movable relative to the cutter 33 by mounting it on a pair of movable supports for movement in two mutually transverse directions, each movement being parallel to one of the movements effected by the ball transmission 47. Furthermore, by rendering the distance of movement of the stylus supporting slides 174 and 178 responsive to the rate of travel of the table 24 and carriage 16 respectively, the stylus 49 is caused to advance ahead of the cutter 33 a constant amount in the direction of movement. With this arrangement, the stylus 49 will anticipate the contour of the pattern as it progresses for precise reproduction. The amount of such anticipation will remain constant for a particular feed rate setting, but will be automatically varied with a variance in the feed rate setting to conform to the particular situation for maximum efficiency.

In the above description the tachometer generators have been described as producing a D.C. voltage for controlling the energization of the positioning motors 184 and 185. The wiring diagram in Fig. 1 therefore illustrates an electrical circuit in which permanent magnets are employed in the tachometer generators 203 and 204 to produce a D.C. voltage which is transmitted from the tachometer generators 203 and 204 directly into the servo motor control box 205 to control the energization of the positioning motors 184 and 185 by the source represented by the lines $L_1$, $L_2$ and $L_3$. With this arrangement, the stylus will be advanced relative to the cutter along the contour of the pattern only.

It may be advantageous to advance the stylus relative to the cutter in a manner so that the advance of the stylus is not entirely in the path of motion of the stylus along the contour of the pattern, but offset a predetermined amount from the path defined by the contour of the pattern. This may be accomplished by employing A.C. tachometer generators 203 and 204 and modifying their connection to the servo motor control box 205 as illustrated in Fig. 9, where only the electrical circuit for exciting the tachometer generators 203 and 204, and their connection to the servo motor control box 205 is shown. The remainder of the electrical circuit from the servo motor control box 205 to the positioning motors 184 and 185 is identical to that shown in Fig. 1 and is therefore omitted in Fig. 9 to avoid confusing the view.

The modification to the electrical circuit to achieve the offset movement of the stylus relative to the contour of the pattern, as shown in Fig. 9, comprises the inclusion of 90° out of phase A.C. exciting voltages to the A.C. tachometer generators 203 and 204, and the addition of a differential resolver synchro 275 between the tachometer generators 203 and 204 and the servo motor control box 205 to effect a preselected phase displacement of the voltages produced by the tachometer generators.

The voltage for exciting the A.C. tachometer generators 203 and 204 is obtained from the three phase source represented by the lines $L_1$, $L_2$ and $L_3$ through a Scott connection 280 as illustrated in Fig. 9. The Scott connection 280 serves to transform the three phase line voltage into a pair of single phase voltages 90° out of phase with each other. It comprises a pair of transformers 276 and 277 with their primaries connected to the lines $L_1$, $L_2$ and $L_3$ as shown, so that the secondary of the transformer 276 will yield a single phase voltage 90° out of phase with a single phase voltage induced in the secondary of the transformer 277.

The voltage from the secondary of the transformer 276 is transmitted through a pair of conductors 281 for exciting the tachometer generator 203. In like manner, the voltage from the transformer 277 is transmitted through a pair of conductors 282 for exciting the tachometer generator 204. Since the tachometer generators 203 and 204 are excited by A.C. voltages 90° out of phase with each other, the voltages produced by them will likewise be 90° out of phase with each other, of an amplitude value directly proportional to the rate at which they are actuated by the ball transmission 47 in the same manner as previously described for the connection illustrated in Fig. 1.

The voltage produced by the tachometer generator 203 is transmitted to the differential resolver synchro 275 through a pair of conductors 285, and likewise the voltage produced by the tachometer generator 204 is transmitted to the differential resolver synchro 275 through a pair of conductors 286. The differential resolver synchro does not disturb the voltages received from the tachometer generators 203 and 204 except to effect their phase displacement by a preselected amount as established by the setting of a pointer 287 mounted on an extension of a shaft (not shown) of the differential resolver synchro. The pointer 287 is mounted on the end of the shaft exteriorly of the differential resolver synchro housing for pivotal movement with the shaft. It cooperates with a graduated scale 288 to indicate the amount of phase displacement which will be effected by the differential resolver synchro, such phase displacement being variable by varying the pivotal position of the pointer 287. The greater the phase displacement of the tachometer generator voltages by the differential resolver synchro 275, the greater will be the offset of the center of the stylus 49 from the contour of the pattern.

After the phase of the voltage from the tachometer generator 203 has been displaced the desired amount it is transmitted from the differential resolver synchro 275 to the servo motor control box 205 by a pair of conductors 291. In like manner, after the phase of the voltage from the tachometer generator 204 has been displaced a like amount it is transmitted from the differential resolver synchro 275 to the servo motor control box 205 through a pair of conductors 292. Thus, the two control voltages produced by the tachometer generators 203 and 204 are transmitted to the servo motor control box 205 through the conductors 291 and 292 respectively after their respective phases have been displaced by the differential resolver synchro 275.

Within the servo motor control box 205 the two voltages from the tachometer generators 203 and 204 with their respective phases displaced by the differential resolver synchro 275 are connected in series to produce one single phase voltage. The phase of this voltage will vary by reason of the variable operation of the tachometer generators 203 and 204, but the variable phase as established by the tachometer generators 203 and 204 will be displaced a preselected amount by the differential resolver synchro 275.

Another Scott connection 280 (not shown) is provided within the servo motor control box 203 to produce a pair of single phase voltages from the three phase line voltage, identical in phase and value to the voltage employed for exciting the tachometer generators 203 and 204. These two voltages are compared in a translator circuit (not shown) with the single phase voltage from the tachometer generators 203 and 204, as modified by the differential resolver synchro, to produce two D.C. control voltages which are then connected to control the operation of the positioning motors 184 and 185 in the same manner that the D.C. voltages from the D.C. tachometer generators 203 and 204 of the previously described embodiment were utilized for controlling the operation of the positioning motors 184 and 185. The translator circuit referred to above for producing the two D.C. control voltages is located in the servo motor control box 205 and a similar circuit is fully described and illustrated in my copending patent application, Serial No. 246,980, filed September 17, 1951, so its operation will therefore not be described in detail here.

As a result of this circuit, the D.C. voltages thus produced correspond to the D.C. voltages which would be produced by the tachometer generators 203 and 204 if they were D.C. generators connected to be actuated by separate take-off wheels driven by the wheels driven by the ball 60 of the ball transmission 47, with these take-off wheels being displaced to contact the ball 60 a preselected distance from the point of contact of the take-off wheels 63 and 64. The net affect is that the modified control voltages serve to control the operation of the positioning motors 184 and 185 so that they move the axis of the stylus 49 relative to the cutter 33, not only in the path defined by the contour of the pattern, but offset from this path as well. The amount of such offset movement is determined by the amount the phases of the voltages of the tachometer generators 203 and 204 are displaced by the differential resolver synchro 275, with the degree of such phase displacement being controlled by setting its pointer 287.

The use of such offset displacement of the stylus 49 would be especially advantageous where it is desired to perform a roughing cut and a finishing cut on a workpiece. The stylus may be initially offset a desired amount, so that the cutter produces a workpiece slightly larger than the pattern. Upon the completion of the roughing operation, the offset movement of the stylus would be eliminated and the cutter would remove a minimum amount of material from the workpiece to produce an accurate reproduction of the pattern.

In addition, the offset displacement of the stylus permits the employment of an oversize stylus that would contact the pattern at a slightly different point than would a stylus of the same diameter as the cutter diameter. At inside corners, such oversize sylus would contact the corner before a normal size stylus would, to provide increased anticipation of the corner to avoid damage to the workpiece and cutter.

Advancement of the tracer stylus is a very effective means for correcting the error in reproduction caused by the time required for the control system to respond to the detection by the tracer stylus of a change in the contour of the pattern. In some applications, by reason of the nature of the tracing operation, or the characteristics of the tracing machine structure, the correction of such error is sufficient to produce the desired accuracy in the reproduction. For this reason, the machine illustrated in Fig. 1, is shown equipped with only the improved apparatus for advancing the tracer stylus ahead of the cutter to anticipate the pattern.

In other applications, the error resulting from the time delay in the response of the control system to a detection of a change in the pattern contour is insignificant, but objectionable error is introduced in the reproduction by the time required to accelerate and decelerate the movable elements of the machine to change the direction of relative movement of the cutter along the workpiece. As previously stated, while the movable elements are accelerating and decelerating, the cutter follows an arcuate path when the pattern calls for a sharp, well defined corner. Under these circumstances, it may be unnecessary to advance the tracer stylus, and the desired accuracy may be achieved solely by minimizing the error due to the time required for accelerating and decelerating the movable elements of the machine. For this reason, the mechanism for advancing the tracer stylus has been omitted from the machine depicted in Fig. 6, and it is shown especially adapted to minimize the error caused by the time required to accelerate and decelerate the movable elements of the machine.

Since both of the corrective mechanisms of the present invention may be utilized individually, they are so shown in the drawings, Fig. 1 illustrating a machine equipped to advance the tracer stylus ahead of the cutter, while Fig. 6 depicts a machine especially adapted to minimize the error introduced during the acceleration and deceleration of the movable elements of the machine.

However, it is to be understood that these mechanisms are intended to be used together with the tachometer generators 203 and 204 serving to control the operation of both of the mechanisms, and in most applications where accurate reproduction is required, they will be combined in a single machine to compensate for both of the most serious causes of error in reproducing operations of this type. For this reason the tracer machine depicted in Figs. 7 to 10 has been shown embodying both of the corrective mechanisms of the present invention, and parts common to the several illustrated machines have been assigned the same reference numerals throughout. The corrective mechanism embodied in the machine shown in Fig. 6 serves to minimize the error occurring during the acceleration and deceleration of the movable elements of the machine by increasing their rate of acceleration and deceleration. Since the machine illustrated in Fig. 6 is not adapted to advance the tracer stylus 49 ahead of the cutter 33, the movable mounting for the stylus 49 has been eliminated therefrom, and instead, the stylus 49 depends from a horizontally extending leg 236 of a bracket 237 which is attached to the side of the carriage 16 by suitable screws 238.

The mechanism for minimizing the error introduced during the acceleration and deceleration of the movable elements of the machine is best seen in Fig. 9, and comprises a pair of positioning motors 243 and 244 electrically connected to be controlled by the tachometer generators 203 and 204 respectively. The tachometer generators 203 and 204 are connected as previously described for actuation by the ball transmission 47 at a rate directly proportional to the rate of rotation of the output shafts 50 and 51 respectively.

The signal voltage developed by the tachometer generator 203 is transmitted to the servo motor control box 205 by the conductors 206, and operates to control the voltage carried by a set of conductors 245 to the positioning motor 243 for energizing it to render its rotary displacement responsive to the signal voltage developed by the tachometer generator 203. In the same manner, the signal voltage developed by the tachometer generator 204 is transmitted to the servo motor control box 205 by the conductor 208, and operates to control the voltage carried from the servo motor control box by a set of conductors (not shown) directly into the interior of the base 15 to the positioning motor 244, shown in Fig. 9. Thus, the rotary displacement of the positioning motor 244 is responsive to the signal voltage produced by the tachometer generator 204.

Figure 8:
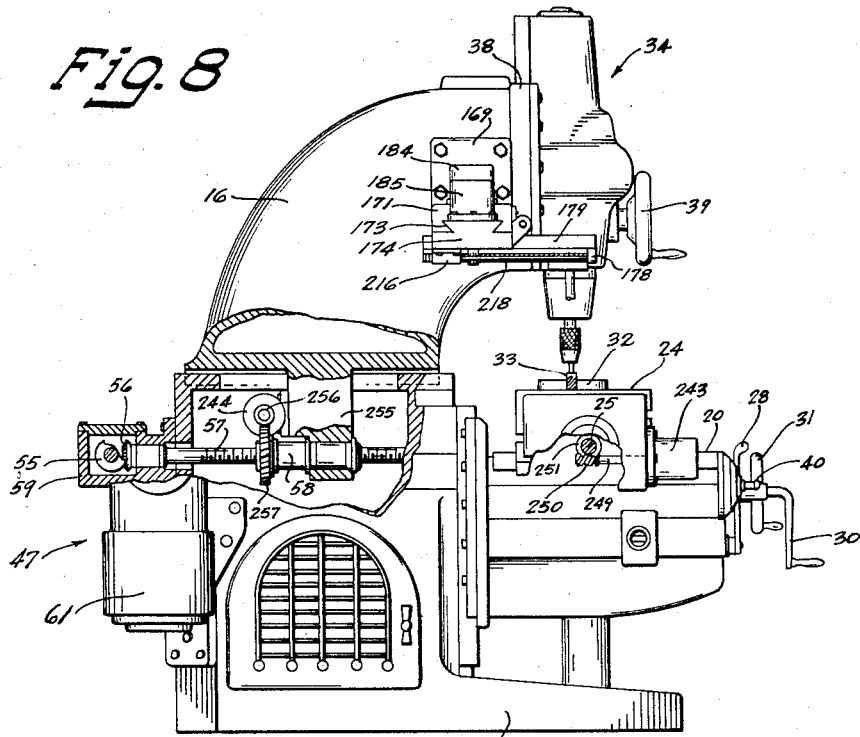
Fig. 8 is a view in side elevation of the pattern controlled machine tool illustrated in Fig. 7.
Figure 10:
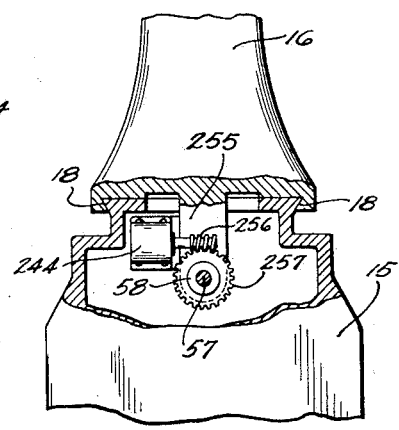
Fig. 10 is a fragmentary rear view of the machine tool depicted in Fig. 8, with parts broken away to show the supplementary driving mechanism for advancing the carriage.

The function of the positioning motors 243 and 244 is to serve as a supplementary drive mechanism for advancing the table 24 and carriage 16 respectively, a relatively small distance ahead of the position to which these members would be instantly located by the primary drive mechanism represented in this instance by the ball transmission 47. The result is that in effect both the stylus 49 and the cutter 33 are advanced ahead of the position to which they would be located relative to the pattern 48 and workpiece 32 by operation of the ball transmission 47 alone. Such advance occurs while the movable members are in motion and in an amount directly proportional to their instant rate of travel. To this end, as best seen in Fig. 8, the positioning motor 243 is provided with a drive shaft 249 having formed thereon a worm 250 in position to operatively engage a worm wheel 251 which is keyed to the end of the table drive screw 25.

The screw 25 is rotatably supported by the table 24, while the nut 54 is rotatably supported by the saddle 19. It will also be recalled that the primary drive 47 actuates the table 24 by revolving the nut 54 which threadedly engages the screw 25. However, rotational movement of the nut 54 by the primary drive 47 will not produce rotation of the screw 25 because of its associated worm wheel 251 being in meshing engagement with the worm 250, through the medium of a self locking thread. Therefore the nut 54 may be rotated relative to the screw 25 and will thereby effect accurate movement of the table 24 in spite of the fact that the screw 25 is rotatably supported by the table 24. By the same token, rotation of the screw 25 by the worm 250 will not cause rotation of the nut 54 because of the meshing engagement of its associated worm wheel 53 with the worm 52 of the drive shaft 50, the worm 52 and worm wheel 53 also being provided with a self locking thread. Therefore, rotation of the worm 250 will produce rotation of the screw 25 relative to the nut 54 to also effect a movement of the table 24 in its path of travel since the nut 54 is supported by the saddle 19.

In operation, the ball transmission 47 rotates the shaft 50 to effect a movement of the table 24 in the desired direction as previously described. At the same time that the drive shaft 50 is being rotated by the ball transmission 47 it actuates the tachometer generator 203, to generate a control voltage, which is directly proportional to the rate of rotation of the drive shaft 50. This voltage is transmitted from the tachometer 203 through the conductors 206 to the servo motor control box 205, to control the voltage carried by a set of conductors 245 to the positioning motor 243. Such voltage serves to energize the positioning motor 243 to effect rotation of the worm 250 and thereby cause a rotation of the screw 25 relative to the nut 54 to advance the table 24 in the same direction as it is being driven by the ball transmission 47.

The positioning motor 243 includes a built in transducer (not shown) connected to the servo motor control box 205 by a set of conductors 252 and identical in operation to the transducers 215 and 216 previously described in connection with the tracer mechanism 46. The potentiometer setting in these transducers is regulated by the positioning motor 243 so that when the latter is deenergized, its associated transducer is in neutral position. When the positioning motor 243 is actuated, it progressively changes the potentiometer setting of its transducer regardless of the direction in which it operates, for the purpose of nullifying the signal voltage delivered through the conductors 206 after the positioning motor 243 has been actuated sufficiently to move the table 24 the desired amount. When the rotation of the output shaft 50 of the ball transmission 47 is decreased, the signal voltage produced by the tachometer generator 203 is decreased proportionately to reduce the voltage delivered to the positioning motor 243 so that its built in transducer permits an error signal voltage to cause reversal of the positioning motor 243 and hence withdraw the table 24 from its advanced position. At the same time the reverse rotation of the positioning motor 243 functions to change the potentiometer setting of its associated transducer to again balance the signal circuit and deenergize the positioning motor 243 after the table 24 has been withdrawn the desired amount.

The positioning motor 244 operates in the same manner in response to the voltage developed by the tachometer generator 204 to advance the carriage 16 ahead of the position to which it is driven by the ball transmission 47 while it is in motion. Thus, as previously described, the tachometer generator 204 is actuated by the rotation of the output shaft 51 of the ball transmission 47, which is connected to drive the carriage 16 in its path of movement. The signal voltage developed by the tachometer generator 204 is directly proportional to the rate of rotation of the output shaft 51, and therefore, to the rate of movement of the carriage 16. Such voltage is transmitted from the tachometer generator 204 through a pair of conductors 208 to the servo motor control box 205 to control the voltage carried to the positioning motor 244 by a set of conductors (not shown) which are directed from the servo motor control box 205 directly into the interior of the base 15 where they are connected to the positioning motor 244 to energize it for rotary displacement in either direction, depending upon the direction of movement of the carriage 16.

The carriage 16 is provided with a depending bracket 255 formed integrally therewith for rotatably supporting the nut 58. The positioning motor 244 is also supported by the bracket 255, and includes an output shaft having keyed thereto a worm 256 disposed for meshing engagement with a cooperating worm wheel 257 secured to the nut 58 to effect its rotation.

As previously mentioned, the screw 57 is journalled in the base 15, and is threadedly engaged with the nut 58 which is rotatably supported by the carriage 16. However, when the screw 57 is rotated by the ball transmission 47 the nut 58 is prevented from rotating with it by reason of the self locking thread formed on the worm wheel 257 and worm 256. Therefore, the nut 58 and its supporting carriage 16 are caused to move relative to the base 15 for effecting the desired movement of the carriage 16. By the same token, when the nut 58 is rotated by the positioning motor 244, the screw 57 is prevented from rotating with it by reason of its mechanical connection with the ball transmission 47, so that the nut 58 is rotated relative to the screw 57, to likewise cause a movement of the carriage 16 relative to the base 15.

The positioning motor 244 is equipped with a built in transducer identical to that described for the positioning motor 243 to prevent continued operation of the motor when energized, limiting its rotary displacement to increments. This transducer is connected to the servomotor control box 205 by a set of conductors (not shown) which are directed from the servomotor control box 205 into the interior of the machine to the positioning motor 244 to effect a connection in the same manner as the transducer of the positioning motor 243 is connected to the servomotor control box 205 by the conductors 252. The length of each of these increments of rotary displacement is dependent directly upon the signal voltage developed by the tachometer generator 204, which, in turn, is directly proportional to the rate of rotation of the output shaft 51. Therefore, the faster the rotation of the output shaft 51, and therefore the rate of movement of the carriage 16, the greater will be the voltage developed by the tachometer generator 204, and therefore the greater will be the rotary displacement of the positioning motor 244.

In operation, the contour of the pattern calls for a movement of the carriage 16 at a definite rate which is effected by the ball transmission 47 through its output shaft 51. As the output shaft 51 is rotating, it actuates the tachometer generator 204 to cause it to develop a signal voltage which is transmitted through the conductors 208, to the servomotor control box 205, to control the voltage carried by conductors (not shown) to the positioning motor 244 to energize it. Thus, while the screw 57 is being rotated by the ball transmission 47 to effect a movement of the carriage 16, the positioning motor 244 is energized to cause the nut 58 to revolve relative to the screw 57 to produce an advance of the carriage 16 a distance ahead of the position to which it would be driven by the transmission 47 alone.

After the positioning motor 244 has rotated the nut 58 the desired amount relative to the screw 57, the nut will be retained in that position for that particular feed rate of the carriage 16. If the rate of movement of the carriage 16 is increased, the voltage developed by the tachometer generator 204 is increased proportionately to effect an additional movement of the positioning motor 244 which, in turn, rotates the nut 58 another increment, and thereby causes a proportionate increment of movement of the carriage 16 ahead of the position to which it would be moved by the transmission 47 alone, while the carriage is being driven by the transmission 47.

On the other hand, when the rate of movement of the carriage 16 is decreased, the signal voltage delivered by the tachometer generator 204 is decreased proportionately to reduce the rotary displacement of the positioning motor 244 so that the nut 58 will be rotated in a direction to withdraw the carriage 16 from its advanced position. Such withdrawal of the carriage 16 from its advanced position continues during its deceleration by the transmission 47 until it is stationary, when the positioning motor 244 will have reached its neutral position.

Thus, it is obvious from the above description, that the positioning motors 243 and 244 operate to increase the rate of deceleration and acceleration of the table 24 and carriage 16 respectively. When the ball transmission 47 is accelerating the table 24, the tachometer generator 203 is likewise being accelerated to deliver a continuously increasing voltage to the servomotor control box 205 to cause a similarly continuously increasing rotary displacement of the positioning motor 243 during the acceleration period only, to thereby further advance the table 24 ahead of the position to which it would be driven by the ball transmission 47 alone. Therefore, in effect, the positioning motor 243 serves to assist the ball transmission 47 in accelerating the table 24 to the desired rate of movement.

On the other hand, when the ball transmission 47 is decelerating the table 24, the signal voltage developed by the tachometer generator 203 to control the rotary displacement of the positioning motor 243 is being decreased continuously during the deceleration period to reduce the rotary displacement of the positioning motor 243 and thereby cause it to withdraw the table 24 from the advanced position and thus assist the ball transmission 47 in decelerating the table 24. The positioning motor 244 operates in the same manner to increase the rate of acceleration and deceleration of the carriage 16. Therefore, in the final analysis, the positioning motors 243 and 244 are, in effect, a supplementary drive mechanism for assisting the ball transmission 47 to accelerate and decelerate the table 24 and carriage 16 respectively, being inoperative at all times except during the acceleration and deceleration periods.

Obviously, therefore, the positioning motors 243 and 244 serve to increase the accuracy of the machine by substantially minimizing the error introduced in the reproduction by the delay in accelerating and decelerating the movable members to the rate of movement required to conform to the contour of the pattern. The tracer mechanism 46, previously described, will effectively correct the error introduced by the time delay in the response of the control system to a detection by the tracer stylus of a change in the contour of the pattern. Since each of the two mechanisms corrects for different shortcomings in the machine, each may be used individually to accommodate any particular situation.

However, in most instances, the several shortcomings may be present simultaneously, having a cumulative effect which results in their cooperating to produce serious inaccuracy. The utilization of either one of the corrective mechanisms of the present invention will serve to minimize the error attributable to one of the causes, to substantially reduce the total error in the reproduction. In some instances only one of the causes of error is significant, and its correction will suffice to obtain precise reproduction. However, for optimum results under all conditions, both corrective mechanisms will be incorporated into the reproducing machine to achieve precision accuracy in the reproduction with the tachometer generators 203 and 204 serving to develop electrical energy for controlling both of the mechanisms as described.

From the foregoing detailed description of the illustrative embodiment set forth herein to exemplify the present invention, it will be apparent that there has been provided an improved pattern controlled machine tool incorporating corrective mechanisms which compensate for the two most serious causes of error in pattern controlled machine tools, to substantially improve the accuracy of the machine in performing reproducing operations, rendering it capable of producing precise reproductions.

Although the exemplary embodiment of the invention has been described in considerable detail in order to fully disclose a practical working apparatus incorporating the invention, it is to be understood that the particular structure shown and described is illustrative only, and that the various characteristics of the invention may be incorporated in other structural forms without departing from the spirit and scope of the invention as defined in the subjoined claims.

The principles of this invention having now been fully explained in connection with the foregoing description, I hereby claim as my invention:

1. In a pattern controlled machine tool, a cutter mounted in position to engage a workpiece, a source of power connected to effect relative movement of said cutter with respect to said workpiece, a stylus supported in spaced relationship to said cutter in position to engage a pattern and connected to control the operation of said power source in accordance with the contour of the pattern to produce uniform movement of the stylus and cutter along the contour of the pattern and workpiece respectively, said stylus being also mounted for movement relative to the cutter in an amount dependent upon the rate of movement of the cutter relative to the workpiece and in the direction of cutter movement relative to the workpiece, whereby said stylus will be moved ahead of the cutter in its path of travel to anticipate the contour of the pattern for accurate reproduction.

2. In a pattern controlled machine tool, a cutter mounted in position to engage a workpiece, a source of power connected to effect relative movement of said cutter with respect to said workpiece, a stylus supported in spaced relationship to said cutter in position to engage a pattern and connected to control the operation of said source of power in accordance with the contour of the pattern to produce uniform simultaneous movement of the stylus and cutter along the contour of the pattern and workpiece respectively, said stylus being also mounted for movement relative to the cutter in a direction dependent upon the direction of cutter movement relative to the workpiece.

3. In a pattern controlled machine tool, a base, a tool support slidably mounted on said base, a cutter rotatably carried by said tool support, a work support slidably mounted on said base to carry a workpiece in position to be operated upon by said cutter, and movable in a path transverse to the path of movement of said tool support, a stylus carried by said tool support for movement with the cutter in position to engage a pattern on said work support, said stylus being also movably mounted on said tool support for movement relative to the cutter, and actuating means connected to move said stylus relative to said cutter, said actuating means being responsive to the direction of relative cutter travel along the workpiece to move the stylus relative to the cutter in a direction corresponding to the direction of cutter travel.

4. In a pattern controlled machine tool, a cutter mounted in position to engage a workpiece, a stylus supported in spaced relationship to said cutter in position to engage a pattern, said cutter and stylus being mounted for uniform simultaneous movement along the contour of the workpiece and pattern respectively as well as for relative movement with respect to each other, and actuating means connected to effect movement of said stylus relative to the cutter, said actuating means being responsive to the contour of the pattern to advance the stylus ahead of the cutter along the contour of the pattern.

5. In a pattern controlled machine tool, a tool support, a work support mounted in operating relationship with respect to said tool support, power means connected to effect relative movement between said tool support and said work support in two mutually transverse paths, a cutter operatively carried by said tool support in position to engage a workpiece on said work support, a pattern contacting stylus movably mounted on said tool support for movement relative to said cutter and in position to engage a pattern on said work support, said stylus being connected to control said power means in response to the contour of the pattern to effect relative movement between said supports to cause said stylus and cutter to follow a path corresponding to the contour of the pattern, and actuating means connected to move said stylus relative to said cutter, and responsive to the contour of the pattern to move said stylus relative to said cutter in a direction corresponding to the contour of the pattern.

6. In a pattern controlled machine tool, a tool support, a work support mounted in operating relationship with respect to said tool support, power means connected to effect relative movement between said tool support and said work support in two mutually transverse paths, a pattern contacting stylus movably mounted on said tool support for movement relative to said tool and in position to contact a pattern on said work support, said stylus being connected to produce a control signal in response to the contour of the pattern, a control element connected to control said power means and to be actuated by said control signal for controlling said power means to effect relative movement between said supports to cause the stylus and tool to follow a uniform path together corresponding to the contour of the pattern, and actuating means connected to move said stylus relative to said tool and responsive to the contour of the pattern to effect such movement in a direction corresponding to the contour of the pattern, whereby the stylus will be moved ahead of the cutter in the path of travel to anticipate the contour of the pattern for accurate reproduction.

7. In a pattern controlled machine tool, a tool support, a work support mounted in operating relationship with said tool support, said tool and work supports being mounted for relative movement in two mutually transverse paths, a tool operably carried by said tool support in position to operate upon a workpiece on said work support, a stylus mounted on said tool support for movement relative to the tool in two mutually transverse paths corresponding to the paths of relative movement of said tool and work supports, and in position to contact a pattern on said work support, power means connected to effect relative movement between said tool and work supports in the two paths of movement for producing uniform relative movement of the stylus and tool along the pattern and workpiece respectively, a pair of positioning motors, each connected to actuate said stylus for incremental movement relative to said tool in one of the two paths of stylus movement, and a pair of tachometer generators, each connected to be driven by said power means to produce a control voltage which controls the operation of said positioning motors so that each positioning motor moves said stylus relative to the tool in one of its paths of movement, in the same direction as the direction of movement of the tool along the workpiece in the corresponding path, and in an amount directly proportional to the rate of movement of said tool along the workpiece in the corresponding path, whereby the stylus will be advanced ahead of the tool along the contour of the pattern by an amount directly proportional to the rate of travel of the tool relative to the workpiece.

8. In a pattern controlled machine tool, a tool support, a work support mounted in operating relationship with said tool support, said tool, and work supports being mounted for relative movement in two mutually transverse paths, a tool operably carried by said tool support in position to operate upon a workpiece on said work support, a first slide carried by said tool support for sliding movement in a rectilinear path corresponding to the path of movement of one of said supports, a second slide carried by said first slide for sliding movement in a rectilinear path transverse to the path of movement of said first slide, a stylus secured to said second slide in position to contact a pattern on said work support, power means connected to effect relative movement between said tool support and said work and pattern support in the two paths of movement for producing uniform relative movement of the stylus and tool together along the pattern and workpiece respectively, a pair of positioning motors, each connected to actuate one of said slides to move said stylus relative to the tool in one of the two paths of stylus movement, and a pair of tachometer generators, each connected to be driven by said power means and to furnish a control voltage for controlling the operation of one of said positioning motors to effect movement of one of said slides in the same direction as the direction of relative movement of the tool along the workpiece in the corresponding path, and in an amount directly proportional to the rate of movement of said tool along the workpiece in the corresponding path, whereby the stylus will be advanced ahead of the tool along the contour of the pattern by an amount directly proportional to the rate of travel of the tool relative to the workpiece.

9. In a pattern controlled machine tool, a tool support, a work support mounted in operating relationship with said tool support, said tool and work supports being mounted for relative movement in two mutually transverse paths, a source of power connected to effect relative movement of said supports in the two paths at variable rates, a tool operably carried by said tool support in position to operate upon a workpiece on said work support, a first slide carried by said tool support for sliding movement in a rectilinear path corresponding to the path of movement of one of said supports, a second slide carried by said first slide for sliding movement in a rectilinear path transverse to the path of movement of said first slide, a stylus secured to said second slide in position to contact a pattern on said work support and connected to control the operation of said source of power in accordance with the contour of the pattern to regulate the rates of relative movement of said supports for producing uniform relative movement of the stylus and tool along the contour of the pattern and workpiece respectively, a first drive means operably connected to drive said first slide in its path of movement a distance directly proportional to the rate of relative movement of said tool and work supports in the corresponding path, and in a direction coinciding with the direction of movement of said tool relative to the workpiece in the same path, and a second drive means operably connected to drive said second slide in its path of movement a distance directly proportional to the rate of relative movement of said tool and work supports in the corresponding path, and in a direction coinciding with the direction of movement of said tool relative to the workpiece in the same path, whereby the stylus will be advanced ahead of the tool along the contour of the pattern by an amount directly proportional to the rate of travel of the tool relative to the workpiece.

10. In a pattern controlled machine tool, a tool support, a work support mounted in operating relationship with said tool support, said tool and work supports being mounted for relative movement in two mutually transverse paths, a tool operably carried by said tool support in position to operate upon a workpiece on said work support, a first slide carried by said tool support for sliding movement in a rectilinear path corresponding to the path of movement of one of said supports, a second slide carried by said first slide for sliding movement in a rectilinear path transverse to the path of movement of said first slide, a stylus secured to said second slide in position to contact a pattern on said work support, and power means connected to drive each of said slides for movement relative to the tool a distance directly proportional to the rate of relative movement between said tool and work supports in the corresponding path, and in the direction of movement of said tool relative to the workpiece in the corresponding path, whereby the stylus will be advanced ahead of the tool along the contour of the pattern by an amount directly proportional to the rate of travel of the tool relative to the workpiece.

11. In a pattern controlled machine tool, a base, a carriage member slidably mounted on said base, a work and pattern supporting table member carried by said base for movement in a path transverse to the path of movement of said carriage, a tool operably mounted on said carriage in position to operate upon a workpiece on said table, a first slide carried by said carriage for movement relative to said tool in a path corresponding to the path of movement of one of said members, a second slide carried by said first slide for movement relative to said tool in a path transverse to the path of movement of said first slide and corresponding to the path of movement of the other of said members, a stylus secured to said second slide in position to contact a pattern on said table, and power means connected to drive each of said slides for movement relative to the tool in their respective paths of movement a distance directly proportional to the rate of movement of said carriage and table members in their corresponding paths of movement, and in the direction of movement of said carriage and table members, whereby the stylus will be advanced ahead of the tool along the contour of the pattern by an amount directly proportional to the rate of travel of the tool relative to the workpiece.

12. In a pattern controlled machine tool, a base, a carriage member slidably mounted on said base, a work and pattern supporting table member carried by said base for movement in a path transverse to the path of movement of said carriage, a tool operably mounted on said carriage in position to operate upon a workpiece on said table, a first slide carried by said carriage for movement relative to said tool in a path corresponding to the path of movement of one of said members, a second slide carried by said first slide for movement relative to said tool in a path transverse to the path of movement of said first slide and corresponding to the path of movement of the other of said members, a stylus secured to said second slide in position to contact a pattern on said table, power means connected to be controlled by the stylus and to drive said carriage and table in their respective paths of movement for producing uniform relative movement of the stylus and tool along the pattern and workpiece respectively, a pair of positioning motors, each connected to actuate one of said slides to move the stylus relative to the tool in one of the two paths of stylus movement, and a pair of tachometer generators, each connected to be driven by said power means and to produce a control voltage to control the operation of one of said positioning motors so that it will effect incremental movement of one of said slides in the same direction as the direction of relative movement of the tool along the workpiece in the corresponding path and in an amount directly proportional to the rate of movement of said tool along the workpiece in the corresponding path, whereby the stylus will be advanced ahead of the tool along the contour of the pattern by an amount directly proportional to the rate of travel of the tool relative to the workpiece.

13. In a pattern controlled machine tool, a source of power, a transmission having two output shafts and connected to be driven by said source of power, a tool support, a work support mounted in operating relationship with said tool support, said supports being mounted for relative movement in two mutually transverse paths, and each being connected to be driven in its path of movement by one of said transmission output shafts, a tool operably carried by said tool support in position to operate upon a workpiece on said work support, a stylus mounted on said tool support for movement relative to the tool in two mutually transverse paths corresponding to the paths of relative movement of said tool support and said work support, and in position to contact a pattern on said work support, said stylus being connected to control the operation of said transmission in accordance with the contour of the pattern so that the stylus and tool progress along the contour of the pattern and workpiece respectively, a pair of tachometer generators, each connected to be driven by said transmission at a rate directly proportional to the rate of rotation of one of said output shafts so that one tachometer generator develops a control voltage directly proportional to the rate of rotation of one of said output shafts, while the other tachometer generator develops a control voltage directly proportional to the rate of rotation of the other of said output shafts, a positioning motor connected to be controlled by the voltage of one of said tachometer generators and to drive said stylus relative to the tool in one of its paths of movement a distance directly proportional to the control voltage developed by its cooperating tachometer generator, and a second positioning motor connected to be controlled by the voltage of the other of said tachometer generators and to drive said stylus relative to the tool in its other path of movement a distance directly proportional to the control voltage developed by its cooperating tachometer generator, whereby the stylus will be advanced ahead of the tool along the contour of the pattern by an amount directly proportional to the rate of travel of the tool relative to the workpiece.

14. In a pattern controlled machine tool, a tool support, a work support mounted in operating relationship with said tool support, said tool and work supports being mounted for relative movement in two mutually transverse paths, a tool operably carried by said tool support in position to operate upon a workpiece on said work support, a stylus mounted on said tool support for movement relative to the tool in position to contact a pattern on said work support, and drive means connected to move said stylus relative to the tool to advance it ahead of the tool in its path of travel in response to the direction and rate of relative movement between said tool and work supports, whereby the stylus will be advanced ahead of the tool along the contour of the pattern by an amount directly proportional to the rate of travel of the tool relative to the workpiece.

15. In a pattern controlled machine tool, a cutter mounted in position to engage a workpiece, a source of power connected to effect relative movement of said cutter with respect to said workpiece, a stylus supported in spaced relationship to said cutter in position to engage a pattern and connected to control the operation of said power source in accordance with the contour of the pattern to produce uniform movement of the stylus and cutter along the contour of the pattern and workpiece respectively, said stylus being also mounted for movement relative to the cutter in an amount dependent upon the rate of movement of the cutter relative to the workpiece and in the direction of cutter movement relative to the workpiece and offset from the direction of cutter movement, whereby said stylus will be moved ahead of the cutter in a direction offset from the contour of the pattern to permit the use of an over-size stylus or to produce a workpiece of a different size than the pattern when the stylus diameter conforms to the cutter diameter.

16. In a pattern controlled machine tool, a cutter mounted in position to engage a workpiece, a stylus supported in spaced relationship to said cutter in position to engage a pattern, said cutter and stylus being mounted for uniform simultaneous movement along the contour of the workpiece and pattern respectively as well as for relative movement with respect to each other, and actuating means connected to effect movement of said stylus relative to the cutter, said actuating means being responsive to the contour of the pattern to advance the stylus ahead of the cutter in a direction offset from the contour of the pattern.

17. In a pattern controlled machine tool, a tool support, a work support mounted in operating relationship with respect to said tool support, power means connected to effect relative movement between said tool support and said work support in two mutually transverse paths, a pattern contacting stylus movably mounted on said tool support for movement relative to said tool and in position to contact a pattern on said work support, said stylus being connected to produce a control signal in response to the contour of the pattern, a control element connected to control said power means and to be actuated by said control signal for controlling said power means to effect relative movement between said supports to cause the stylus and cutter to follow a uniform path together corresponding to the contour of the pattern, and actuating means connected to move said stylus relative to said cutter and responsive to the contour of the pattern to effect such movement to advance the stylus ahead of the cutter while they are in motion but offset from the path of travel as defined by the contour of the pattern.

18. In a pattern controlled machine tool, a cutter mounted in position to engage a workpiece, a source of power connected to effect relative movement of said cutter with respect to said workpiece, a stylus supported in spaced relationship to said cutter in position to engage a pattern and connected to control the operation of said power source in accordance with the contour of the pattern to produce uniform movement of the stylus and cutter along the contour of the pattern and workpiece respectively, said stylus being also mounted for movement relative to the cutter, a pair of positioning motors connected to effect movement of said stylus relative to the cutter when actuated, a pair of tachometer generators connected to be operated by said source of power to produce a control voltage for controlling the operation of said positioning motors to effect a movement of the stylus in the same direction as the direction of movement of the cutter along the workpiece in the path defined by the contour of the pattern, and in an amount directly proportional to the rate of movement of said cutter along the workpiece, and a differential resolver synchro connected to receive the voltages from said tachometer generators and operable to effect a displacement of their phase to produce a modified control voltage for controlling the operation of said positioning motors so that they effect a movement of the stylus relative to the cutter in the direction of movement of the cutter along the workpiece but offset from the path defined by the contour of the pattern.

19. In a pattern controlled machine tool, a cutter mounted in position to engage a workpiece, a source of power connected to effect relative movement of said cutter with respect to said workpiece, a stylus supported in spaced relationship to said cutter in position to engage a pattern and connected to control the operation of said power source in accordance with the contour of the pattern to produce uniform movement of the stylus and cutter along the contour of the pattern and workpiece respectively, said stylus being also mounted for movement relative to the cutter, a pair of positioning motors connected to effect movement of said stylus relative to the cutter when actuated, a pair of tachometer generators each connected to be operated by said source of power to produce a single phase control voltage for controlling the operation of one of said positioning motors to effect a movement of the stylus relative to the cutter in the same direction as the direction of movement of the cutter along the workpiece in the path defined by the contour of the pattern, and in an amount directly proportional to the rate of movement of said cutter along the workpiece, a differential resolver synchro connected to receive the voltages from said tachometer generators and operable to effect a displacement of their phase, and a translator circuit responsive to the phase displaced voltages from said differential resolver synchro to produce a modified control voltage connected to control the operation of said positioning motors so that they cause a movement of the stylus relative to the cutter in the direction of movement of the cutter along the workpiece but offset from the path defined by the contour of the pattern.

20. In a pattern controlled machine tool, a support slidably mounted for movement in a definite path, a source of power connected to drive said support in its path of movement, a stylus mounted on the machine in position to contact a pattern and connected to control the operation of said source of power in accordance with the contour of the pattern, and supplemental drive means connected to drive said support and responsive to the rate of operation of said source of power and operably connected to function simultaneously with said source of power and in conjunction therewith to assist said source of power in accelerating and decelerating said support to the desired rate of movement as established by the contour of the pattern, whereby a more rapid response to the contour of the pattern is obtained to improve the accuracy of the reproduction.

21. In a pattern controlled machine tool, a tool support, a work support, said supports being mounted for relative movement in two mutually transverse paths, a source of power connected to effect the relative movement of said supports in the two paths at variable rates, a stylus mounted on said tool support in position to contact a pattern on said work support and connected to control the operation of said power source to determine the rate of relative movement of said supports in the two paths in accordance with the contour of the pattern, and supplemental drive means responsive to the operation of said source of power, and operably connected to assist in accelerating and decelerating the relative movement of said supports to the desired rate of movement as determined by the contour of the pattern.

22. In a pattern controlled machine tool, a tool support, a work support, said supports being mounted for relative movement in two mutually transverse paths, a source of power connected to effect the relative movement of said supports in the two paths at variable rates, a stylus mounted on said tool support in position to contact a pattern on said work support and connected to control the operation of said power source to establish the rate of relative movement of said supports in the two paths in accordance with the contour of the pattern, a first supplemental drive means responsive to the rate of relative movement of the supports in one of said paths of movement and connected to assist said source of power in accelerating and decelerating the relative movement of the supports in the same path, and a second supplemental drive means responsive to the rate of relative movement of the supports in the other of said paths of movement and connected to assist said source of power in accelerating and decelerating the relative movement of the supports in the same path, whereby the machine is caused to respond more rapidly to a change in contour of the pattern to improve the accuracy of the reproduction.

23. In a pattern controlled machine tool, a tool support, a work support, said supports being mounted for relative movement in two mutually transverse paths, a source of power connected to effect the relative movement of said supports in the two paths at variable rates, a stylus mounted on said tool support in position to contact a pattern on said work support and connected to control the operation of said power source to establish the rate of relative movement of said supports in the two paths in accordance with the contour of the pattern, a first supplemental drive means connected to effect incremental relative movement of said supports in one of their paths of movement in the same direction as effected by said power source and a distance directly proportional to the rate of movement in the same path as effected by said power source, and a second supplemental drive means connected to effect incremental relative movement of said supports in the other of their paths of movement in the same direction as effected by said power source and a distance directly proportional to the rate of movement in the same path as effected by said power source, whereby said supplemental drive means serves to advance the supports in their paths of movement while they are in motion ahead of the position to which they are driven by said power source alone.

24. In a pattern controlled machine tool, a tool support, a work support, said supports being mounted for relative movement in two mutually transverse paths, a source of power connected to effect the relative movement of said supports in the two paths at variable rates, a stylus mounted on said tool support in position to contact a pattern on said work support and connected to control the operation of said power source to establish the rate of relative movement of said supports in the two paths in accordance with the contour of the pattern, a first supplemental drive means connected to operate during the acceleration and deceleration of the relative movement of the supports in one of the two paths to drive the support ahead of the position to which it would be driven by the power source alone during a period of acceleration, and to withdraw the support from such advanced position while it is being decelerated, and a second supplemental drive means connected to operate during the acceleration and deceleration of the relative movement of the supports in the other of the two paths to drive the support ahead of the position to which it would be driven by the power source alone during a period of acceleration, and to withdraw the support from such advanced position while it is being decelerated, whereby said supplemental drive means serve to assist the power source in accelerating and decelerating the relative movement of said supports to improve the accuracy of the reproduction.

25. In a machine tool, a first support slidably mounted for movement in a definite path, a second support mounted for movement in a path transverse to the path of movement of said first support, a source of power, a transmission connected to be actuated by said source of power and having a first output shaft connected to drive said first support in its path of movement at variable rates and a second output shaft connected to drive said second support in its path of movement at variable rates, a first tachometer generator connected to be driven by said transmission at a rate directly proportional to the rate of rotation of said first output shaft so that the voltage developed by it will vary directly as the rate of rotation of said first output shaft, a second tachometer generator connected to be driven by said transmission at a rate directly proportional to the rate of rotation of said second output shaft so that the voltage developed by it will vary directly as the rate of rotation of said second output shaft, a first positioning motor connected to be controlled by the voltage from said first tachometer generator and to drive said first support in its path of movement a distance directly proportional to the control voltage developed by said first tachometer generator, and a second positioning motor connected to be controlled by the voltage from said second tachometer and to drive said second support in its path of movement a distance directly proportional to the voltage developed by said second tachometer generator, whereby said positioning motors serve to advance the supports while they are in motion ahead of the position to which they would be driven by the output shafts of the transmission to assist the transmission in accelerating and decelerating the supports to the desired rate of movement.

26. In a machine tool, a support slidably mounted for movement in a definite path, a source of power, a transmission connected to be actuated by said source of power and to drive said support in its path of movement at variable rates, a tachometer generator connected to be driven by said transmission at a rate directly proportional to the rate of movement of the support so that the voltage developed by it will vary directly as the rate of movement of the support, and a positioning motor connected to be controlled by the voltage from said tachometer generator and to drive the support in its path of movement a distance directly proportional to the voltage developed by said tachometer generator, whereby the positioning motor serves to advance the support while it is in motion ahead of the position to which it would be driven by the transmission alone to assist the transmission in accelerating and decelerating the support to the desired rate of movement.

27. In a pattern controlled machine tool, a support slidably mounted for movement in a definite path, a source of power, a transmission connected to be actuated by said source of power and to drive said support in its path of movement at variable rates, a stylus supported on the machine in position to contact a pattern and connected to regulate the operation of the transmission in accordance with the contour of the pattern to control the rate of movement of the support, a tachometer generator connected to be driven by said transmission at a rate directly proportional to the rate of movement of the support so that the voltage developed by it will vary directly as the rate of movement of the support, and a positioning motor connected to be controlled by the voltage from said tachometer generator and to drive the support in its path of movement a distance directly proportional to the voltage developed by said tachometer generator, whereby the positioning motor serves to advance the support, while it is in motion, ahead of the position to which it would be driven by the transmission alone, to assist the transmission in accelerating and decelerating the support to the desired rate of movement, and thereby produce a more rapid response to a change in the contour of the pattern.

28. In a pattern controlled machine tool, a support slidably mounted for movement in a definite path, a source of power connected to drive said support in its path of movement at variable rates, a stylus supported on the machine in position to contact a pattern and connected to regulate the operation of said power source in accorance with the contour of the pattern to control the rate of movement of the support, a tachometer generator connected to be driven by said source of power at a rate directly proportional to the rate of movement of the support so that the voltage developed by it will vary directly as the rate of movement of the support, and a positioning motor connected to be controlled by the voltage from said tachometer generator and to drive the support in its path of movement a distance directly proportional to the voltage developed by said tachometer generator, whereby the positioning motor serves to advance the support while it is in motion ahead of the position to which it would otherwise be driven by the power source alone to increase the rate of acceleration and deceleration of the support and thereby produce a more rapid response to a change in the contour of the pattern.

29. In a pattern controlled machine tool, a tool support, a work support, said supports being mounted for relative movement in two mutually transverse paths, a source of power connected to effect the relative movement of said supports in the two paths at variable rates, a stylus mounted on said tool support in position to contact a pattern on said work support and connected to control the operation of said power source to establish the rate of relative movement of said supports in the two paths in accordance with the contour of the pattern, a first tachometer generator connected to be driven at a rate directly proportional to the rate of relative movement of said supports in one of the paths of movement so that the voltage developed by it will vary directly as the rate of relative movement of the supports in the single path of movement, a second tachometer generator connected to be driven at a rate directly proportional to the rate of relative movement of said supports in the second path of movement so that the voltage developed by it will vary directly as the rate of relative movement of the supports in the second path of movement, a first positioning motor connected to be controlled by the voltage from said first tachometer generator and to effect relative movement of said supports in their first path of movement a distance directly proportional to the voltage developed by said first tachometer generator, and a second positioning motor connected to be controlled by the voltage from said second tachometer generator and to effect relative movement of said supports in their second path of movement a distance directly proportional to the voltage developed by said second tachometer generator, whereby said positioning motors serve to advance the supports while they are in motion ahead of the relative position to which they would otherwise be driven by the source of power alone to increase the rate of acceleration and deceleration of their relative movement and thereby produce a more rapid response to a change in the contour of the pattern.

30. In a pattern controlled machine tool, a tool support slidably mounted for movement in a definite path, a work support mounted for movement in a path transverse to the path of movement of said tool support, a source of power, a stylus mounted on said tool support in position to contact a pattern on said work support and connected to control the operation of said power source in accordance with the contour of the pattern, a screw rotatably carried by said work support, a nut in meshing engagement with said screw and rotatably carried by the machine for rotation relative to said screw to effect movement of the work support in its path of travel, said nut being connected to be rotated by said power source at variable rates for driving the work support at variable rates, a second nut rotatably carried by said tool support, a second screw in meshing engagement with said second nut and rotatably carried by the machine for rotation relative to said second nut, said second screw being connected to be rotated by said power source at variable rates for driving the tool support at variable rates, a first positioning motor connected to rotate said first screw relative to its associated nut in variable increments varying directly with the value of the voltage received by the positioning motor to effect a corresponding increment of movement of the work support, a second positioning motor connected to rotate said second nut relative to its associated screw in variable increments varying directly with the value of the voltage received by the second positioning motor to effect a corresponding increment of movement of the tool support, a first tachometer generator connected to be driven at a rate directly proportional to the rate of movement of said work support so that the voltage developed by it will vary directly as the rate of movement of the work support, said first tachometer generator being connected to control the operation of said first positioning motor to thereby regulate the distance and direction of an increment of movement of the tool support, and a second tachometer generator connected to be dirven at a rate directly proportional to the rate of movement of said tool support so that the voltage developed by it will vary directly as the rate of movement of the tool support, said second tachometer generator being connected to control the operation of said second positioning motor to thereby regulate the distance and direction of an increment of movement of the tool support, whereby said positioning motors serve to advance the supports while they are in motion ahead of the relative position to which they would otherwise be driven by the source of power alone to increase the rate of acceleration and deceleration of their relative movement and thereby produce a more rapid response to a change in the contour of the pattern.

31. In a pattern controlled machine tool, a first support slidably mounted for movement in a definite path, a second support mounted for movement in a path transverse to the path of movement of said first support, a source of power, a stylus supported in position to contact a pattern and connected to control the operation of said power source in accordance with the contour of the pattern, a first screw and nut mechanism operatively engaged to produce movement of said first support when actuated, and connected to be actuated by said power source at variable rates for varying the rate of movement of said first support, a second screw and nut mechanism operatively engaged to produce movement of said second support when actuated and connected to be actuated by said power source at variable rates for varying the rate of movement of said second support, a first positioning motor connected to effect relative rotation between said first screw and nut in increments to move said first support in increments varying in length directly with the voltage received by said first positioning motor, a second positioning motor connected to effect relative rotation between said first screw and nut in increments to move said second support in increments varying in length directly with the voltage received by said second positioning motor, a first tachometer generator connected to be driven at a rate directly proportional to the rate of movement of said first support so that the control voltage developed by it will vary directly as the rate of movement of said first support, said first tachometer generator being connected to deliver its voltage to control the flow of energizing voltage to said first positioning motor to thereby regulate the length and direction of an increment of movement of said first support, and a second tachometer generator connected to be driven at a rate directly proportional to the rate of movement of said second support so that the control voltage developed by it will vary directly as the rate of movement of said second support, said second tachometer generator being connected to deliver its voltage to control the flow of energizing voltage to said second positioning motor to thereby regulate the length and direction of an increment of movement of said second support, whereby said positioning motors serve to advance the supports while they are in motion ahead of the relative position to which they would otherwise be driven by the source of power alone to increase the rate of acceleration and deceleration of their movement in their respective paths of travel and thereby produce a more rapid response to a change in the contour of the pattern.

32. In a pattern controlled machine tool, a first support slidably mounted for movement in a definite path, a second support mounted for movement in a path transverse to the path of movement of said first support, a source of power, a stylus supported in position to contact a pattern and connected to control the operation of said power source in accordance with the contour of the pattern, a first screw and nut mechanism operatively engaged to produce movement of said first support when actuated and connected to be actuated by said power source at variable rates for varying the rate of movement of said first support, a second screw and nut mechanism operatively engaged to produce movement of said second support when actuated and connected to be actuated by said power source at variable rates for varying the rate of movement of said second support, a first drive mechanism connected to actuate said first screw and nut mechanism in increments to move said first support while it is in motion in increments of a length varying directly with the instant rate of movement of said first support and in the same direction, and a second drive mechanism connected to actuate said second screw and nut mechanism in increments to move said second support while it is in motion in increments of a length varying directly with the instant rate of movement of said second support and in the same direction, whereby said drive mechanisms serve to advance the supports while they are in motion ahead of the relative position to which they would otherwise be driven by the source of power alone to increase the rate of acceleration and deceleration of their movement in their respective paths of travel, and thereby produce a more rapid response to a change in the contour of the pattern.

33. In a pattern controlled machine tool, a first support slidably mounted for movement in a definite path, a second support mounted for movement in a path transverse to the path of movement of said first support, a source of power, a stylus supported in position to contact a pattern and connected to control the operation of said power source in accordance with the contour of the pattern, a first screw and nut mechanism operatively engaged to produce movement of said first support when actuated and connected to be actuated by said power source at variable rates for varying the rate of movement of said first support, a second screw and nut mechanism operatively engaged to produce movement of said second support when actuated and connected to be actuated by said power source at variable rates for varying the rate of movement of said second support, and a drive mechanism connected to be actuated by said power source and to actuate said screw and nut mechanisms in increments to drive said supports in increments while they are in motion, a distance directly proportional to their respective instant rates of movement as established by said power source and in the same direction, whereby said drive mechanism serves to advance the supports while they are in motion ahead of the relative position to which they would otherwise be driven by the source of power alone to increase the rate of acceleration and deceleration of their movement in their respective paths of travel and thereby produce a more rapid response to a change in the contour of the pattern.

34. In a pattern controlled machine tool, a support slidably mounted for movement in a definite path, a source of power, a stylus supported in position to contact a pattern and connected to control the operation of said source of power in accordance with the contour of the pattern, a screw and nut mechanism operatively engaged to produce movement of said support when actuated, and connected to be actuated by said source of power at variable rates for varying the rate of movement of said support, and a drive mechanism connected to be actuated by said source of power and to actuate said screw and nut mechanism in increments to drive said support in increments while it is in motion, a distance directly proportional to its instant rate of movement as established by said power source and in the same direction, whereby said drive mechanism serves to advance the support while it is in motion ahead of the position to which it would otherwise be driven by the source of power alone to increase the rate of acceleration and deceleration of its movement in its path of travel and thereby produce a more rapid response to a change in the contour of the pattern.

35. In a pattern controlled machine tool, a support slidably mounted for movement in a definite path, a source of power, a stylus supported in position to contact a pattern and connected to control the operation of said power source in accordance with the contour of the pattern, a screw and nut mechanism operatively engaged to effect movement of said support when actuated, and connected to be actuated by said power source at variable rates for varying the rate of movement of said support, a positioning motor connected to actuate said screw and nut mechanism in increments of a length varying directly with the voltage received by it, and a tachometer generator connected to be driven at a rate directly proportional to the rate of movement of said support so that the voltage developed by it will vary directly as the rate of movement of said support, said tachometer generator being connected to deliver its voltage to control the flow of energizing voltage to said positioning motor to thereby regulate the length of an increment of movement of said support, whereby said positioning motor serves to advance the support while it is in motion ahead of the position to which it would otherwise be driven by the source of power alone to increase its rate of acceleration and deceleration and thereby produce a more rapid response to a change in the contour of the pattern.

36. In a machine tool, a support slidably mounted for movement in a definite path, a source of power, a screw and nut mechanism operatively engaged to effect movement of said support when actuated and connected to be actuated by said power source at selectively variable rates for varying the rate of movement of said support, a positioning motor connected to actuate said screw and nut mechanism in increments of a length varying directly with the voltage received by it, and a tachometer generator connected to be driven at a rate directly proportional to the rate of movement of said support so that the voltage developed by it will vary directly as the rate of movement of said support, said tachometer generator being connected to deliver its voltage to control the flow of energizing voltage to said positioning motor to thereby regulate the length of an increment of movement of said support while it is in motion, whereby said positioning motor serves to advance the support while it is in motion ahead of the position to which it would otherwise be driven by the source of power alone to increase its rate of acceleration and deceleration.

37. In a machine tool, a support slidably mounted for movement in a definite path, a source of power, a screw and nut mechanism operatively engaged to effect movement of said support when actuated and connected to be actuated by said power source at selectively variable rates for varying the rate of movement of said support, and a drive mechanism connected to be actuated by said source of power and to actuate said screw and nut mechanism in increments to drive said support in increments while it is in motion, a distance directly proportional to its instant rate of movement as established by said power source and in the same direction, whereby said drive mechanism serves to advance the support while it is in motion ahead of the position to which it would otherwise be driven by the source of power alone to increase its rate of acceleration and deceleration.

38. In a machine tool, a first support slidably mounted for movement in a definite path, a second support mounted for movement in a path transverse to the path of movement of said first support, a source of power, a first screw and nut mechanism operatively engaged to effect movement of said first support when actuated and connected to be actuated by said power source at variable rates for varying the rate of movement of said first support, a second screw and nut mechanism operatively engaged to produce movement of said second support when actuated and connected to be actuated by said power source at variable rates for varying the rate of movement of said second support, and a drive mechanism connected to be actuated by said power source and to actuate said screw and nut mechanisms in increments to drive said supports in increments while they are in motion, a distance directly proportional to their respective instant rates of movement as established by said power source and in the same direction, whereby said drive mechanism serves to advance the supports while they are in motion ahead of the position to which they would otherwise be driven by the source of power alone to increase the rate of acceleration and deceleration of their movement in their respective paths of travel.

39. In a pattern controlled machine tool, a tool support, a work support, said supports being mounted for relative movement in two mutually transverse paths, a source of power connected to effect the relative movement of said supports in the two paths at variable rates, a cutter operatively carried by said tool support in position to engage a workpiece on said work support, a stylus mounted on said tool support in position to contact a pattern, and connected to control the operation of said source of power in accordance with the contour of the pattern, said stylus being movable on said tool support relative to the cutter a distance determined by the rate of travel of the cutter along the workpiece in the direction of its movement along the workpiece, and supplemental drive means responsive to the operation of said source of power and operably connected to assist said source of power in accelerating and decelerating said supports to the desired rate of movement as established by the contour of the pattern, whereby the advance of the stylus ahead of the cutter serves to anticipate the pattern, and the supplemental drive means serves to increase the rate of acceleration and deceleration of the supports for accurate reproduction.

40. In a pattern controlled machine tool, a tool support, a work support, said supports being mounted for relative movement in two mutually transverse paths, a source of power connected to effect the relative movement of said supports in the two paths at variable rates, a cutter operatively carried by said tool support in position to engage a workpiece on said work support, a stylus mounted on said tool support in position to engage a pattern on said work support and connected to control the operation of said source of power in accordance with the contour of the pattern to regulate the movement of said supports for producing uniform simultaneous movement of the stylus and cutter along the contour of the pattern and workpiece respectively, said stylus being mobably mounted on said tool support for movement relative to the cutter, actuating means connected to move said stylus relative to said cutter a distance directly proportional to the rate of relative movement of the cutter along the workpiece, and in the same direction as the direction of relative movement of the cutter along the workpiece, and supplemental drive means responsive to the operation of said source of power and operably connected to assist said source of power in accelerating and decelerating said supports to the desired rate of movement as established by the contour of the pattern, whereby the advance of the stylus ahead of the cutter serves to anticipate the contour of the pattern and the supplemental drive means serves to increase the rate of acceleration and deceleration of the supports to improve the accuracy of the reproduction.

41. In a pattern controlled machine tool, a tool support, a work support, said supports being mounted for relative movement in two mutually transverse paths, a source of power connected to effect the relative movement of said supports in the two paths at variable rates, a cutter operatively carried by said tool support in position to engage a workpiece on said work support, a stylus on said work support connected to control the operation of said source of power in accordance with the contour of the pattern to regulate the movement of said supports for producing uniform simultaneous movement of the stylus and cutter along the contour of the pattern and workpiece respectively, said stylus being movably mounted on said tool support for movement relative to the cutter in two paths corresponding to the two paths of relative movement of said supports, a pair of positioning motors, each connected to actuate said stylus for movement relative to the cutter in one of the two paths of stylus movement, a pair of tachometer generators, each connected to be driven by said power means and to control the flow of energizing voltage to one of said positioning motors to regulate its operation for moving said stylus relative to the cutter in one of its paths of movement, in the same direction as the direction of movement of the cutter along the workpiece in the corresponding path, and in an amount directly proportional to the rate of movement of said cutter along the workpiece, in the corresponding path, and supplemental drive means operably connected to assist said source of power in accelerating and decelerating said supports to the desired rate of movement as established by the contour of the pattern, whereby the advance of the stylus ahead of the cutter serves to anticipate the contour of the pattern, and the supplemental drive means serves to increase the rate of acceleration and deceleration to improve the accuracy of the reproduction.

42. In a pattern controlled machine tool, a tool support, a work support, said supports being mounted for relative movement in two mutually transverse paths, a source of power connected to effect the relative movement of said supports in the two paths at variable rates, a cutter operatively carried by said tool support in position to engage a workpiece on said work support, a stylus mounted on said tool support in position to engage a pattern on said work support and connected to control the operation of said source of power in accordance with the contour of the pattern to regulate the movement of said supports for producing uniform simultaneous movement of the stylus and cutter along the contour of the pattern and workpiece respectively, said stylus being movably mounted on said tool support for movement relative to the cutter in two paths corresponding to the two paths of relative movement of said supports, a pair of positioning motors, each connected to actuate said stylus for movement relative to the cutter in one of the two paths of stylus movement a distance directly proportional to the voltage received by said positioning motors, a second pair of positioning motors, each connected to effect incremental relative movement of said supports in one of the two paths of movement a distance directly proportional to the voltage received by said second pair of positioning motors, and a pair of tachometer generators each connected to be driven by said source of power to produce a control voltage for controlling the flow of energizing voltage to one of each of said two pair of positioning motors to regulate their operation for moving a support in its path of movement and the stylus relative to the cutter in the corresponding path, said tachometer generators being driven at a rate directly proportional to the rate of movement of said supports so that the control voltage developed by them will vary accordingly, to vary the flow of energizing voltage to said positioning motors directly as the rate of movement of said supports, whereby the stylus and supports will be moved by said positioning motors a distance directly proportional to the rate of movement of said supports.

43. In a pattern controlled machine tool, a tool support, a work support, said supports being mounted for relative movement in two mutually transverse paths, a source of power connected to effect the relative movement of said supports in the two paths at variable rates, a cutter operatively carried by said tool support in position to engage a workpiece on said work support, a stylus mounted on said tool support in position to engage a pattern on said work support and connected to control the operation of said source of power in accordance with the contour of the pattern to regulate the relative movement of said supports for producing uniform simultaneous movement of the stylus and cutter along the contour of the pattern and workpiece respectively, said stylus being movably mounted on said tool support for movement relative to the cutter in two paths corresponding to the two paths of relative movement of said supports, drive means connected to move said stylus relative to said cutter a distance directly proportional to the rate of relative movement of the cutter along the workpiece, and in the same direction as the direction of relative movement of the cutter along the workpiece, a pair of positioning motors, each connected to effect relative movement of said supports in one of the two paths of movement a distance directly proportional to the voltage received, and a pair of tachometer generators each connected to be driven by said source of power to produce a control voltage to control the flow of energizing voltage to one of said positioning motors to regulate its operation for effecting relative movement of said supports in one of the two paths of movement, said tachometer generators being driven at a rate directly proportional to the rate of relative movement of said supports as effected by said source of power so that the control voltage developed by them will vary accordingly, to vary the flow of energizing voltage to said positioning motors directly as the rate of movement of said supports to produce relative movement of said supports, while they are in motion, a distance directly proportional to their instant rate of relative movement.

44. In a pattern controlled machine tool, a tool support, a work support, said supports being mounted for relative movement in two mutually transverse paths, a source of power connected to effect the relative movement of said supports in the two paths at variable rates, a cutter operatively carried by said tool support in position to engage a workpiece on said work support, a first slide carried by said tool support for sliding movement in a rectilinear path corresponding to one of the two paths of relative movement of said supports, a second slide carried by said first slide for sliding movement in a rectilinear path transverse to the path of movement of said first slide, a stylus secured to said second slide in position to contact a pattern on said work support and connected to control the operation of said source of power in accordance with the contour of the pattern to regulate the relative movement of said supports for producing uniform simultaneous movement of the stylus and cutter along the contour of the pattern and workpiece respectively, a pair of tachometer generators, each connected to be driven by said source of power at a rate directly proportional to the rate of relative movement of said supports in one of the two paths of movement so that one tachometer generator develops a voltage directly proportional to the rate of relative movement of said supports in one of the two paths, and the other tachometer generator develops a voltage directly proportional to the rate of relative movement of said supports in the other of the two paths, a pair of positioning motors, each connected to actuate one of said slides and to be controlled in its operation by the voltage produced by one of said tachometer generators so that its rotary displacement is directly proportional to the voltage produced by its cooperating tachometer generator to thereby move said stylus relative to the cutter in one of the two paths of stylus movement a distance directly proportional to the rate of relative movement of said supports in the same path, and a second pair of positioning motors, each connected to effect a movement of one of said supports and to be controlled in its operation by the voltage produced by one of said tachometer generators so that its rotary displacement is directly proportional to the voltage produced by its cooperating tachometer generator to thereby effect in incremental movement of its associated support while it is in motion, a distance directly proportional to rate of relative movement of said support as established by said source of power and in the same direction as its instant direction of movement, whereby the first pair of positioning motors serve to advance the stylus ahead of the cutter to anticipate the contour of the pattern, and the second pair of positioning motors operate to assist the power source in accelerating and decelerating the relative movement of the supports for accurate reproduction.

45. In a pattern controlled machine tool, a tool support slidably mounted on the machine for movement in a definite path, a source of power connected to effect movement of said tool support at variable rates, a work support mounted on the machine in operating relationship to said tool support to present a pattern and workpiece, a cutter operatively carried by said tool support in position to operate upon the workpiece on said work support, a stylus mounted on said tool support in position to contact the pattern on the work support and connected to control the operation of said source of power in accordance with the contour of the pattern to regulate the rate of movement of the tool support and thereby produce a uniform movement of the stylus and cutter along the contour of the pattern and workpiece respectively, said stylus being movably mounted on said tool support for movement relative to the cutter in a path parallel to the path of movement of said support, a tachometer generator connected to be driven at a rate directly proportional to the rate of movement of said tool support so that it develops a control voltage which varies directly with the rate of movement of the tool support, a positioning motor connected to actuate said stylus for movement relative to the cutter and to be controlled in its operation by the voltage produced by the tachometer generator so that its rotary displacement is directly proportional to the voltage produced by the tachometer generator to move the stylus relative to the cutter a distance directly proportional to the rate of movement of the tool support and in the same direction, to advance the stylus ahead of the cutter to anticipate the contour of the pattern, a second positioning motor connected to effect increments of movement of the tool support and to be controlled in its operation by the voltage produced by the tachometer generator so that its rotary displacement is directly proportional to the voltage produced by the tachometer generator to effect an incremental movement of the tool support while it is in motion, a distance directly proportional to the rate of movement of the tool support as established by said source of power and in the same direction, to increase the rate of acceleration and deceleration of the tool support, whereby the anticipation of the contour of the pattern and the increased rate of acceleration and deceleration of the tool support operate to improve the accuracy of the reproduction.

46. In a pattern controlled machine tool, a tool support slidably mounted on the machine for movement in a definite path, a source of power connected to effect movement of said tool support at variable rates, a work support mounted on the machine in operating relationship to said tool support to present a pattern and workpiece, a cutter operatively carried by said tool support in position to operate upon the workpiece on said work support, a stylus mounted on said tool support in position to contact the pattern on the work support and connected to control the operation of said source of power in accordance with the contour of the pattern to regulate the rate of movement of the tool support and thereby produce a uniform simultaneous movement of the stylus and cutter along the contour of the pattern and workpiece respectively, said stylus being movably mounted on said tool support for movement relative to the cutter, drive means connected to move the stylus relative to the cutter a distance directly proportional to the rate of movement of the tool support and in the same direction as the direction of movement of the tool support to advance the stylus ahead of the cutter in their paths of travel along the pattern and workpiece respectively, and second drive means actuated by said source of power and operably connected to assist said source of power in accelerating and decelerating the tool support to the desired rate of movement as established by the contour of the pattern, whereby the advance of the stylus ahead of the cutter serves to anticipate the contour of the pattern, and the second drive means operates to increase the rate of acceleration and deceleration of the tool support to increase the accuracy of the reproduction.

References Cited in the file of this patent
UNITED STATES PATENTS

| | | |
|---|---|---|
| 2,331,337 | Meyer | Oct. 12, 1943 |
| 2,335,304 | Parsons | Nov. 30, 1943 |
| 2,482,627 | Langston | Sept. 20, 1949 |
| 2,511,956 | Wetzel | June 20, 1950 |
| 2,571,801 | Wangerin et al. | Oct. 16, 1951 |
| 2,710,934 | Senn | June 14, 1955 |
| 2,752,827 | Ernst | July 3, 1956 |
| 2,778,280 | Trofimov | Jan. 22, 1957 |